United States Patent
Feng et al.

(10) Patent No.: US 11,550,457 B2
(45) Date of Patent: Jan. 10, 2023

(54) METHOD, DEVICE, APPARATUS AND STORAGE MEDIUM OF DISPLAYING INFORMATION ON VIDEO

(71) Applicant: BEIJING BYTEDANCE NETWORK TECHNOLOGY CO., LTD., Beijing (CN)

(72) Inventors: Mengluo Feng, Beijing (CN); Xiaohang Huang, Beijing (CN); Jingui Wang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/310,026

(22) PCT Filed: Jan. 10, 2020

(86) PCT No.: PCT/CN2020/071519
§ 371 (c)(1),
(2) Date: Jul. 12, 2021

(87) PCT Pub. No.: WO2020/143795
PCT Pub. Date: Jul. 16, 2020

(65) Prior Publication Data
US 2022/0100355 A1    Mar. 31, 2022

(30) Foreign Application Priority Data

Jan. 12, 2019  (CN) .......................... 201910029260.4
Feb. 1, 2019   (CN) .......................... 201910105702.9

(51) Int. Cl.
G06F 3/04842     (2022.01)
G06F 3/01        (2006.01)
(Continued)

(52) U.S. Cl.
CPC .......... *G06F 3/04842* (2013.01); *G06F 3/016* (2013.01); *G06F 3/04886* (2013.01); *H04N 21/4314* (2013.01); *H04N 21/47217* (2013.01)

(58) Field of Classification Search
None
See application file for complete search history.

(56) References Cited

U.S. PATENT DOCUMENTS 10,097,879 B1   10/2018   Bates et al.
10,372,322 B2*  8/2019    Heo .................... G06F 3/04817
(Continued)

FOREIGN PATENT DOCUMENTS

CN    1640129 A      7/2005
CN    101035261 A    9/2007
(Continued)

OTHER PUBLICATIONS

International Patent Application No. PCT/CN2020/071519; Int'l Search Report; dated Apr. 8, 2020; 2 pages.
(Continued)

*Primary Examiner* — Toan H Vu
(74) *Attorney, Agent, or Firm* — BakerHostetler

(57) ABSTRACT

A method, a device, an apparatus and a storage medium of displaying information on video are provided. The method includes acquiring a touchable element to be displayed in a process of playing video and configuration information of the touchable element sent from a server; determining, based on the configuration information of the touchable element, display time of the touchable element in the process of playing video and a display location of the touchable element on video interface, and displaying the touchable element based on the display time and the display location; and when a touch operation on the touchable element which is
(Continued)

displayed is detected, responding to the touch operation based on a preset response tactic.

27 Claims, 5 Drawing Sheets

(51) Int. Cl.
*G06F 3/04886* (2022.01)
*H04N 21/431* (2011.01)
*H04N 21/472* (2011.01)

(56) References Cited

U.S. PATENT DOCUMENTS

| | | | |
|---|---|---|---|
| 2002/0162117 | A1 | 10/2002 | Pearson et al. |
| 2009/0007196 | A1 | 1/2009 | Ganesan |
| 2009/0129749 | A1 | 5/2009 | Oyamatsu et al. |
| 2009/0228921 | A1 | 9/2009 | Miki et al. |
| 2012/0050185 | A1 | 3/2012 | Davydov et al. |
| 2014/0059434 | A1 | 2/2014 | Anzures et al. |
| 2014/0289771 | A1 | 9/2014 | Lee et al. |
| 2015/0063784 | A1* | 3/2015 | Oota .............. H04N 17/004 386/263 |
| 2015/0156537 | A1 | 6/2015 | Moon et al. |
| 2015/0212692 | A1* | 7/2015 | Hyun .............. G06F 3/0488 715/719 |
| 2015/0365587 | A1* | 12/2015 | Ha .............. H04N 5/232945 715/721 |
| 2016/0041998 | A1 | 2/2016 | Hall et al. |
| 2016/0127772 | A1* | 5/2016 | Tsiridis .............. H04N 21/4424 725/41 |
| 2016/0345059 | A1* | 11/2016 | Xiao .............. H04N 21/4725 |
| 2016/0370956 | A1 | 12/2016 | Penha et al. |
| 2017/0031534 | A1* | 2/2017 | Singh .............. G06F 3/017 |
| 2017/0285860 | A1 | 10/2017 | Siddiq et al. |
| 2018/0157381 | A1* | 6/2018 | Jung .............. H04L 12/1859 |
| 2018/0309849 | A1 | 10/2018 | Lewis et al. |
| 2019/0306561 | A1* | 10/2019 | Xu .............. G06F 3/0488 |
| 2019/0342618 | A1* | 11/2019 | Dudko .............. H04N 21/4316 |

FOREIGN PATENT DOCUMENTS

| | | |
|---|---|---|
| CN | 101035279 A | 9/2007 |
| CN | 102572524 A | 7/2012 |
| CN | 103024561 A | 4/2013 |
| CN | 103179465 A | 6/2013 |
| CN | 103229513 A | 7/2013 |
| CN | 103646655 A | 3/2014 |
| CN | 103703789 A | 4/2014 |
| CN | 103997691 A | 8/2014 |
| CN | 104159159 A | 11/2014 |
| CN | 104168491 A | 11/2014 |
| CN | 104537027 A | 4/2015 |
| CN | 104754419 A | 7/2015 |
| CN | 104811814 A | 7/2015 |
| CN | 105094668 A | 11/2015 |
| CN | 105407405 A | 3/2016 |
| CN | 105488172 A | 4/2016 |
| CN | 105657465 A | 6/2016 |
| CN | 105893422 A | 8/2016 |
| CN | 105898593 A | 8/2016 |
| CN | 105930026 A | 9/2016 |
| CN | 106488293 A | 3/2017 |
| CN | 106791970 A | 5/2017 |
| CN | 106935254 A | 7/2017 |
| CN | 106959795 A | 7/2017 |
| CN | 107483973 A | 12/2017 |
| CN | 107515871 A | 12/2017 |
| CN | 107786903 A | 3/2018 |
| CN | 108024139 A | 5/2018 |
| CN | 108174247 A | 6/2018 |
| CN | 108419137 A | 8/2018 |
| CN | 108696765 A | 10/2018 |
| CN | 108900888 A | 11/2018 |
| CN | 108984073 A | 12/2018 |
| CN | 109104630 A | 12/2018 |
| WO | WO 2012/151646 A1 | 11/2012 |
| WO | WO 2018/174637 A1 | 9/2018 |

OTHER PUBLICATIONS

International Patent Application No. PCT/CN2020/071521; Int'l Search Report; dated Apr. 9, 2020; 2 pages.

* cited by examiner

METHOD, DEVICE, APPARATUS AND STORAGE MEDIUM OF DISPLAYING INFORMATION ON VIDEO

CROSS-REFERENCE TO RELATED APPLICATION

The present disclosure is the U.S. National Stage of International Application No. PCT/CN2020/071519, filed on Jan. 10, 2020, which claims priority benefit of CN application Ser. No. 201910029260.4, filed on Jan. 12, 2019, and CN application Ser. No. 201910105702.9, filed on Feb. 1, 2019. The entireties of the above-mentioned patent application are hereby incorporated by reference and made a part of this specification.

TECHNICAL FIELD

The disclosure relates to a computing technological realm, and more particularly to a method, device, apparatus and storage medium of displaying information on video.

BACKGROUND

When a video is played, besides the content of the video, the user may also see an advertising bar which appears simultaneously with the content of the video on the playing interface at a specific time of the play, for example, the advertising bar may have a content that: please send a short message to 12345 to participate in the voting.

If the advertising bar is added into the video in post-production, the content of the advertising bar in the video cannot be changed any more once the production is finished, so that the advertising bar is not flexible and can only be implemented in a single form, and cannot provide interaction with the user.

SUMMARY

Embodiments of the disclosure provide a playing method, device, apparatus and storage medium of displaying information on video, which can dynamically configure a touchable element and improve the flexibility and diversity of displaying the touchable element, as well as enhancing the interactivity with users.

An embodiment of the disclosure provides a method of displaying information on video, and the method includes acquiring a touchable element to be displayed in a process of playing video and configuration information of the touchable element sent from a server; determining, based on the configuration information of the touchable element, display time of the touchable element in the process of playing video and a display location of the touchable element on a video interface, and displaying the touchable element based on the display time and the display location; and when a touch operation on the touchable element which is displayed is detected, responding to the touch operation based on a preset response tactic.

An embodiment of the disclosure further provides a device of displaying information on video, and the device includes a configuration information acquisition module configured for acquiring a touchable element to be displayed in a process of playing video and configuration information of the touchable element sent from a server; a touchable element display module, configured for determining display time of the touchable element in the process of playing video and a display location of the touchable element on a video interface based on the configuration information of the touchable element and displaying the touchable element based on the display time and the display location; and a touch operation response module configured for responding to the touch operation based on a preset response tactic when a touch operation on the touchable element which is displayed is detected.

An embodiment of the disclosure further provides a terminal apparatus; the apparatus includes at least one processor; a memory configured to store at least one program; the at least one program, when executed by the at least one processor, causing the at least one processor to implement the method of displaying information on video according to any of embodiments of the disclosure.

On a fourth aspect, an embodiment of the disclosure further provides a computer readable storage medium, stored a computer program therein, when the computer program is executed by a processor, the method of displaying information on video according to any of embodiments of the disclosure is implemented.

DETAILED DESCRIPTION OF PREFERRED EMBODIMENTS

Embodiments of the disclosure will now be described, by way of example, with reference to the accompanying drawings in which embodiments of the disclosure are shown, and it is to be understood that the described embodiments are only a few, but not all embodiments of the disclosure. Based on the embodiments in the disclosure, all other embodiments obtained by those skilled in the art without involving any inventive effort are within the scope of the disclosure.

In the following embodiments, optional features and examples are provided in each embodiment at the same time, and features described in the embodiments may be combined to form alternatives, and each numbered embodiment should not be construed as merely a single technical solution; the embodiments may also be combined in the absence of conflict.

First Embodiment

Figure 1:
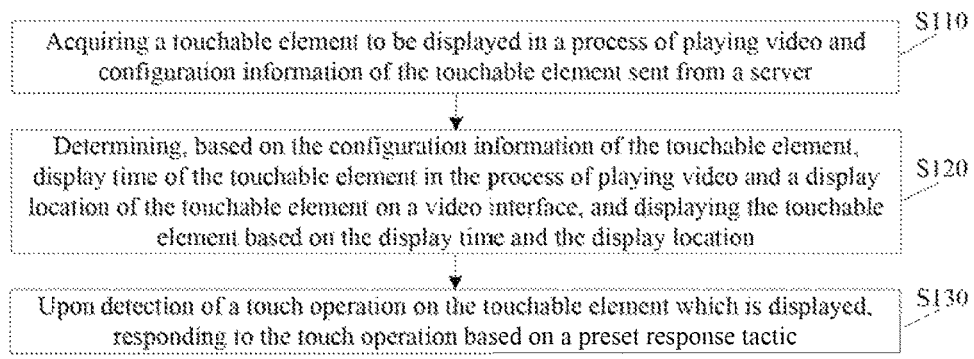
FIG. 1 is a flowchart of a method for displaying information on video provided by a first embodiment of the disclosure.

FIG. 1 is a flowchart of a method for displaying information on video provided by a first embodiment of the disclosure, and this embodiment is applicable to the case where information is displayed on a video interface. The method may be performed by an device for displaying information on video, which may be implemented by software and/or hardware, integrated in a terminal having a video playing function, such as a smart phone, a tablet computer, etc. Referring to FIG. 1, the method includes the following steps.

S110, a touchable element to be displayed in a process of playing video and configuration information of the touchable element sent from a server are acquired.

In an embodiment, the touchable element may include: at least one of an image, a control, a video, or an animated image. One or more touchable elements may be displayed in the process of playing video, and one or more touchable elements may be displayed at the same time in the process of playing video. The touchable element is a visible or invisible element. The touchable element is an invisible element, which may be a transparent touchable element and invisible to the user. For example, the invisible element may be applied in a scenario for finding a specific content on video frame, such as a goof on video, in which at least one invisible element is displayed in the playing video, and the display location of the invisible element is the position of the goof in the video frame. Ater the user clicks on the invisible element, related information of the clicking operation may be sent to the server; the server may record the related information and generate a feedback content based on the recorded related information (i.e. how many goofs have been found, etc.), and then send the feedback content to the client, and the client displays the feedback content. When the touchable element is a visible element, the content displayed on the touchable element may include: at least one of a Chinese character, a number, a letter, a symbol, and an image.

The server may determine the touchable element and the configuration information of the touchable element to be delivered based on service specification, and the server may also determine the touchable element and the configuration information of the touchable element to be delivered based on tactics information, such as the screen size.

In an embodiment, the configuration information of the touchable element includes: at least one of display start time, display duration, display location, and display effect information.

In an embodiment, the configuration information of the touchable element may include: at least one of display start time, display duration, and display location. After the time of the touchable element displayed from the display start time reaches the display duration, the touchable element may disappear from the screen. The display duration may be equal to or longer than the time for displaying a video frame.

The configuration information of the touchable element may further include: display effect information of the touchable element; and the display effect information may include: at least one of the displayed color, shape, style and size, and a display tactic (i.e. an animation path, an animation effect, etc.).

As an embodiment, the display effect information may be determined by the server according to statistical data of touch operations performed by one or more users on the touchable element. In an embodiment, the statistical data may include the number of times, frequency, etc. For example, if the click frequency on a touchable element is higher than a set frequency threshold, the touchable element is displayed by a first display effect, and if the click frequency on a touchable element is lower than the set frequency threshold, the touchable element is displayed by a second display effect. In an embodiment, the first display effect may be: displaying the touchable element in warm tone, and the second display effect may be: displaying the touchable element in cold tone. That is, if a certain touchable element is to be displayed via a video client of the current user, a corresponding display effect may be determined according to the click frequency and/or number of clicks on the touchable element by one or more users, and information of the determined display effect is delivered to the video client of the current user, so that the video client of the current user can display the touchable element with the display effect. In an embodiment, one or more users may include the current user, and the click frequency and/or number of clicks on the touchable element by the current user can refer to the historical click frequency and/or historical number of clicks on the touchable element by the current user. In this embodiment, the corresponding display effect is determined based on the statistical data of touch operations of users on the touchable element, and touchable elements can be displayed with different display effects, so as to distinguish the touchable elements; for example, touchable elements may be distinguished by popularity, and the user can decide whether to perform a touch operation on the touchable element according to the popularity of the touchable element.

Exemplarily, when the touchable element is a visible element, the background color of the touchable element may be set to be transparent so as to reduce the range of video content blocked by the touchable element.

In an embodiment, a touchable element to be displayed in a process of playing video and configuration information of the touchable element sent from a server may be acquired by the following way: a touchable element to be displayed in a process of playing video and configuration information of the touchable element sent from a server before playing the video can be acquired; for example, when an instruction for playing a video triggered by a user is detected, a request for playing the video is sent to the server, and video data as well as a touchable element to be displayed in the process of playing video and configuration information of the touchable element sent from the server are received. Alternatively, a delivery request is sent to a server at a first setting time in the process of playing video, and a touchable element to be displayed at a second setting time in the process of playing the video and configuration information of the touchable element delivered from the server are received; the second setting time is latter than the first setting time; for example, when a trigger operation on a touchable element is received, that is, when a touch operation on another touchable element that has been displayed is detected, or a delivery request is sent to the server at a preset/predetermined point in the process of playing the video. Alternatively, a touchable element to be displayed in the process of playing video and configuration information of the touchable element delivered from a server is received during playing the video; that is, the client does not need to send a delivery request, while the server actively delivers the touchable element and the configuration information of the touchable element based on service specification, service policies, etc.

S120, according to the configuration information of the touchable element, display time of the touchable element in the process of playing the video and/or a display location of the touchable element on a video interface are determined, and the touchable element is displayed according to the display time and/or the display location.

In an embodiment, the touchable element may be displayed according to the display time and the display location in the following way: based on the display location, the touchable element is rendered and displayed on a middle layer of the video interface at the display time, the video interface includes three layers; the middle layer of the video interface is configured for displaying the touchable element, a bottom layer of the video interface is configured for displaying video frames, and a top layer of the video interface is configured for displaying a playing control assembly; or, based on the display location, the touchable element is rendered and displayed on a top layer of the video interface at the display time; the video interface includes two layers; a bottom layer of the video interface is configured for displaying video frames, and the top layer of the video interface is configured for displaying the touchable element and the playing control assembly.

In an embodiment, the touchable element may be rendered and displayed on a middle layer of the video interface at the display time in the following way: when the playing time of the video reaches the display start time of the touchable element, the rendering of the touchable element starts on a middle layer of the video interface based on the configuration information of the touchable element, and the rendered touchable element is throughout displayed in the display duration. Based on the display location, the touchable element may be rendered and displayed on a top layer of the video interface at the display time in the following way: when the playing time of the video reaches the display start time of the touchable element, the rendering of the touchable element starts on a top layer of the video interface based on the configuration information of the touchable element, and the rendered touchable element is throughout displayed in the display duration.

The playing control assembly includes a pause key, a progress bar, etc. In an embodiment, the display location of the touchable element may not overlap with that of the playing control assembly; or, when the display location of the touchable element overlaps with that of the playing control assembly, upon detection of a touch operation at the display location, whether the touch operation is aimed at either the touchable element or the playing control assembly is determined according to preset response priorities, and when the touch operation aims at the touchable element, the touch operation is responded according to a preset response tactics for the touchable element, and when the touch operation aims at the playing control assembly, the touch operation is responded according to a preset response tactics for the playing control assembly. In an embodiment, the preset response priorities may be determined based on which layers the touchable element and the playing control assembly are located in the video interface. For example, when the video interface includes three layers in which a middle layer of the video interface is used for displaying the touchable element and a top layer of the video interface is used for displaying the playing control assembly, the response priority of the playing control assembly is higher than that of the touchable element because the layer of the playing control assembly located in the video interface is higher than the layer of the touchable element located in the video interface. That is, when a touch operation is detected at the display location, it is determined that the touch operation is aiming at the playing control assembly according to the preset response priority, and the touch operation is responded according to a preset response tactic for the playing control assembly.

The display location of the touchable element on the video interface may be either a fixed location or locations changing dynamically so as to improve the diversity and flexibility of the display of the touchable element. For example, the touchable element is fixedly displayed at a certain location in the video, or the touchable element is dynamically moved and displayed at display locations along a certain direction (i.e. clockwise, counterclockwise, from the top down, or from left to right) as the display time goes on so as to allow the touchable element to be consistently displayed at a blank position in the video interface at any playing time, thereby improving the viewing experience of the user.

In an embodiment, when the touchable element is displayed, the process of playing the video may be uninterrupted.

S130, if a touch operation on the displayed touchable element is detected, the touch operation is responded according to a preset response tactic.

In an embodiment, the touch operation includes a contact and/or non-contact interactive operation. For example, the touch operation may include: contact interactive operations on the touchable element, and non-contact interactive operations such as voice operations and the like; for example, contact interactive operations may include click operations and/or slide operations.

In an embodiment, the touch operation is responded according to a preset response tactic, which may include at least one of displaying a preset content, displaying a preset animation effect, playing a preset audio or video, redirecting to a page, performing a preset function, communicating with a preset server, enabling a preset application, and popping up a preset function interface. In an embodiment, the displayed preset content may include an image, an animated image, a control, etc. The preset content to be displayed, the preset animation effect to be displayed, and the preset audio or video to be played may be either downloaded from the server, or generated by the client according to a preset response tactic, and the preset response tactic may be delivered from the server in advance. Exemplarily, the preset response tactic may be delivered to the video client along with configuration information of the touchable element. The preset content may be displayed, or the preset animation effect may be displayed, or the preset audio or video may be played on a browser page, a local page or a video interface. Redirecting to a page may be as follows: a redirect request is sent to a server, the server acquires a page content or address to be redirected to according to the redirect request and delivers the page content or address, and after the page content or address is received, the received page content or a page content downloaded based on the page address is displayed on a browser page. Performing a preset function may include following a microblog, etc., and performing a preset function may include, sending a preset function request to a server, and the server performs a related operation corresponding to the preset function according to the preset function request; for example, according to a social contact request, such as following a microblog, the server connects a social server such as a microblog server, sends a social contact request message to the social server, and receives a response message fed back from the social server regarding the social contact message, and according to the response message and other related information fed back from the social server, the server may also reply the response message and/or other related information to the sender of the preset function request (i.e. the video client); or the server delivers a webpage address or content corresponding to the preset function according to the preset function request, and the client, after receiving the webpage address or content, displays a webpage content downloaded based on the webpage address on a browser page or displays the received webpage content on the browser page, and the displayed webpage executes a related operation corresponding to the preset function according to an operation of the user; for example, the webpage receives a select operation of a button in the webpage by the user, sends a select message to the server, receives a select response fed back from the server, and updates the display content in the webpage based on the response. In communication with the preset server, the address information of the server may be delivered in advance by the server, and the preset feedback content may be obtained or the preset function may be executed through communication with the server. Enabling a preset application may be implemented in the following way: related information (i.e. identifier information) of an application to be enabled is acquired; the related information may be sent from the server in advance, and may also be generated in real time according to information of a touchable element upon detection of a touch operation. Then, according to the related information, the video playing application (i.e. the video client) sends an application enabling instruction to a control module of a terminal apparatus where the client resides, and the control module enables the corresponding application in the terminal apparatus according to the enabling instruction. In enabling the preset application, it may redirect to any page and any application via a configured scheme url.

Popping up a preset function interface includes a popping up a dialer interface, an SMS messenger interface, etc. Popping up a preset function interface may be as follows: a video client generates and sends a function interface calling instruction corresponding to a touchable element receiving a touch operation, and a control module of a terminal apparatus where the client resides pops up a corresponding function interface based on the function interface calling instruction. For example, if the touchable element is a control for making a call, a dialer interface calling instruction may be generated upon detection of a touch operation on the control, so that a dialer interface is popped up for display, and the user can dial on the dialer interface.

In an embodiment, the touch operation is responded according to a preset response tactic, which may be implemented in the following way: a feedback content determined based on a preset response tactic and related information of the touch operation is acquired; and the feedback content is displayed.

In an embodiment, after detection of the touch operation on the displayed touchable element, it further includes collecting related information of the touch operation; correspondingly, acquiring a feedback content determined based on a preset response tactic and the related information of the touch operation and displaying the feedback content can include acquiring a feedback content determined based on the preset response tactic and the collected related information of the touch operation when preset conditions are satisfied; and the feedback content is displayed; or, a feedback content determined based on the preset response tactic and the collected related information of the touch operation is acquired; and when preset conditions are satisfied, the feedback content is displayed.

In this embodiment, related information of the touch operation is collected, which may be implemented as follows: related information of the touch operation is reported to the server such that a feedback content is determined by the server based on a preset response tactic and the related information of the touch operation; or, related information of the touch operation is cached such that a feedback content is determined based on a preset response tactic and the related information of the touch operation in the video client.

In an embodiment, when preset conditions are satisfied, acquiring a feedback content determined based on the preset response tactic and the collected related information of the touch operation includes receiving a feedback content delivered from the server when preset conditions are satisfied; the feedback content is generated by the server based on the preset response tactic and the received related information of the touch operation.

As an embodiment, responding the touch operation according to a preset response tactic may be implemented in the following way: related information of the touch operation is reported to a server; a feedback content delivered from the server is received; and the feedback content is displayed; the feedback content is determined by the server according to the preset response tactic and the received related information of the touch operation.

This embodiment may also be implemented as follows: related information of the touch operation is reported to a server; when preset conditions are satisfied, a feedback content delivered from the server is received; and the feedback content is displayed; the feedback content is generated by the server according to the preset response tactic and the received related information of the touch operation; or a feedback content generated according to the preset response tactic and the received related information of the touch operation is acquired from the server; and when preset conditions are satisfied, the feedback content is displayed.

It should be noted that, it may be implemented as follows: when preset conditions are satisfied, related information of the detected touch operation is sent to a server, and upon reception of a feedback content delivered from the server, the feedback content is displayed immediately; it may also be implemented as follows: upon detection of a touch operation every time, related information of the touch operation is immediately sent to a server, and a feedback content from the server is not immediately displayed upon reception of the feedback content every time, but is displayed when preset conditions are satisfied; it may also be implemented as follows: upon detection of a touch operation every time, related information of the touch operation is immediately sent to a server while a request message is sent to the server when preset conditions are satisfied; the server generates a feedback content according to the received related information of the touch operation upon reception of the request message, and returns the feedback content to the client, and the client displays the feedback content; and it may also be implemented as follows: upon detection of a touch operation every time, related information of the touch operation is immediately sent to a server, the server generates a feedback content according to the received related information of the touch operation when preset conditions are satisfied, and returns the feedback content to the client, and the client displays the feedback content. The preset conditions may include: reaching a set point in time of playing the video, detecting a touch operation of a preset control, etc. The feedback content delivered from the server may be carried by a file such as an HTML, XHTML, HTML5, CSS, javascript, etc., that is, the server delivers a file such as HTML, XHTML, HTML5, CSS or javascript carrying the feedback content to the client, and the client obtains the feedback content to be displayed by parsing the file such as HTML, XHTML, HTML5, CSS or javascript.

In an embodiment, the preset control may be a touchable element in this embodiment, and the display time and/or the display location of the preset control may be configured and sent from the server.

As an embodiment, receiving and displaying a feedback content delivered from the server may be implemented in the following way: when preset conditions are satisfied, a feedback content delivered from the server is received and displayed.

In an embodiment, when preset conditions are satisfied, receiving a feedback content delivered from the server includes: upon reaching a set point in time during a progress of playing video, a feedback content sent from the server is received; or, upon detecting a touch operation on a preset control, a response request is sent to the server, and a feedback content sent from the server according to the response request is received; or, upon reaching a set point in time during a progress of playing video, an interactive bar element is displayed based on information for displaying the interactive bar element sent from the server; and upon detecting a touch operation on the interactive bar element, a response request is sent to the server, and a feedback content sent from the server according to the response request is received.

In an embodiment, when preset conditions are satisfied, a feedback content sent from the server is received and displayed, which can include at least three solutions as follows.

First, upon reaching a set point in time during a progress of playing video, a feedback content sent from the server is received and displayed; or a feedback content sent from the server is received in advance, and the feedback content is displayed upon reaching a set point in time during a progress of playing video. For example, at initial time of playing video, all feedback contents that may be possibly delivered for the touchable element are received, and then the corresponding feedback content is displayed when the touchable element is triggered by a user. Another example is that the feedback content is delivered when the touchable element is triggered by a user, but the feedback content is displayed after a preset period of time or after a preset control is triggered.

Second, upon detecting a touch operation on a preset control, a response request is sent to the server, and a feedback content sent from the server according to the response request is received and displayed. The preset control may be displayed throughout the entire process of playing video, or may be displayed when preset conditions are satisfied; for example, the preset control is displayed when a preset point in time is reached, and the preset point in time may be a point in time at which the first touchable element is displayed, or another point in time.

In an embodiment, upon detecting a touch operation on the touchable element, a relevance display can be disposed between the touchable element and the preset control. In an embodiment, the relevance may be displayed with an animation effect (e.g. an animation effect that an arrow or a flash of lightning moves from the touchable element to the preset control at a certain speed), so as to prompt the user that the touch operation has been collected, and inform the user that a corresponding feedback content can be obtained by performing the touch operation on the preset control.

Third, upon reaching a set point in time during a progress of playing video, an interactive bar content sent from the server is received and displayed, or upon reaching a set point in time during a progress of playing video, information sent from the server for displaying an interactive bar element is received, and the interactive bar element is displayed according to the information, or information previously sent from the server for displaying the interactive bar element at a set point in time during a progress of playing video is received; if a touch operation on the interactive bar element by a user is detected within a set time period, a response request will be sent to a server, and a feedback content sent from the server according to the response request is received and displayed (i.e., the feedback content is displayed on a browser page); of course, the feedback content can further be determined based on a response tactic sent from the server in advance and displayed; if no touch operation on the interactive bar element by the user is detected within the set time period, the display of the interactive bar element will be canceled. In an embodiment, the interactive bar element may be a touchable element in this embodiment, such as an image, a control, an animated image, etc.

In an embodiment, the response request may include a detected duration of the touch operation on the preset control, so that the server can generate a feedback content according to the duration of the touch operation on the preset control, thereby achieving the effect of displaying the feedback content with different effects according to different durations of the touch operation on the preset control by the user.

In an embodiment, acquiring a feedback content determined based on the preset response tactic and the collected related information of the touch operation, and when preset conditions are satisfied, displaying the feedback content include: acquiring a feedback content generated according to the preset response tactic and the received related information of the touch operation sent from the server, and upon reaching a set point in time during a progress of playing video, displaying the feedback content; or, acquiring a feedback content generated according to the preset response tactic and the received related information of the touch operation sent from the server, and upon detecting a touch operation on a preset control, displaying the feedback content; or, acquiring a feedback content generated according to the preset response tactic and the received related information of the touch operation sent from the server, upon reaching a set point in time during a progress of playing video, displaying an interactive bar element based on information for displaying the interactive bar element sent from the server, and upon detecting a touch operation on the interactive bar element, displaying the feedback content.

In an embodiment, the feedback content generated according to the preset response tactic and the received related information of the touch operation sent from the server is acquired; and when preset conditions are satisfied, the feedback content is displayed, which can include at least three solutions as follows.

First, the feedback content generated according to the preset response tactic and the received related information of the touch operation sent from the server is acquired, and the feedback content is displayed upon reaching a set point in time during a progress of playing video. For example, after the server generates a feedback content based on the preset response tactic and the received related information of the touch operation, the feedback content is immediately sent to the client, and at end time of playing video, the client displays the received feedback content from the server.

Second, the feedback content generated according to the preset response tactic and the received related information of the touch operation sent from the server is acquired, and the feedback content is displayed upon detecting a touch operation on a preset control. The preset control may be displayed throughout the entire process of playing video, or may be displayed when preset conditions are satisfied; for example, the preset control is displayed when a preset point in time is up, and the preset point in time may be a point in time at which the last touchable element is displayed, or another point in time.

In an embodiment, upon detecting a touch operation on the touchable element, relevance display can be disposed between the touchable element and the preset control.

Third, a feedback content generated according to the preset response tactic and the received related information of the touch operation sent from the server is acquired; upon reaching a set point in time during a progress of playing video, an interactive bar element is displayed based on information for displaying the interactive bar element sent from the server; and upon detecting a touch operation on the interactive bar element, the feedback content is displayed. In an embodiment, the information of the interactive bar element may be sent from the server in advance or sent from the server upon reaching a set point in time during a progress of playing video.

As another example, the touch operation is responded according to a preset response tactic, which may be implemented in the following way: the feedback content is determined according to the related information of the touch operation and a preset response tactic sent from the server, and the feedback content is displayed. Exemplarily, the preset response tactic may be sent from the server to the client prior to displaying the touchable element, which may be delivered to the client prior to or in the process of playing video, or together with the delivery of configuration information of the touchable element to the client.

In an embodiment, when preset conditions are satisfied, acquiring a feedback content determined based on the preset response tactic and the collected related information of the touch operation includes: when preset conditions are satisfied, the feedback content is determined according to the cached related information of the touch operation and a response tactic sent from the server.

The embodiment may also be implemented as follows. Related information of the touch operation is cached; when preset conditions are satisfied, a feedback content is determined according to the cached related information of the touch operation and a response tactic sent from the server, and the feedback content is displayed; or a feedback content is determined according to the cached related information of the touch operation and a response tactic sent from the server; when preset conditions are satisfied, the feedback content will be displayed.

In an embodiment, when preset conditions are satisfied, determining the feedback content according to the cached related information of the touch operation and a response tactic sent from the server can include at least two solutions as follow.

First, upon reaching a set point in time during a progress of playing video, the feedback content is determined according to the cached related information of the touch operation and a response tactic sent from the server.

Second, upon detecting a touch operation on a preset control, the feedback content is determined according to the cached related information of the touch operation and a response tactic sent from the server. This mode may be as follows. Upon detecting a touch operation on a preset control, a feedback content is determined according to the duration of the touch operation on the preset control, the cached related information of the touch operation and a response tactic sent from the server, thereby achieving the effect of displaying the feedback content with different effects according to different durations of the touch operation on the preset control by the user.

In an embodiment, a feedback content generated based on the preset response tactic and the collected related information of the touch operation is acquired, and when preset conditions are satisfied, the feedback content is displayed, which can include: determining a feedback content according to the cached related information of the touch operation and a response tactic sent from the server, and upon reaching a set point in time during a progress of playing video, displaying the feedback content; or, determining a feedback content according to the cached related information of the touch operation and a response tactic sent from the server, and upon detecting a touch operation on a preset control, displaying the feedback content.

In an embodiment, the feedback content is determined according to the cached related information of the touch operation and a response tactic sent from the server; when preset conditions are satisfied, the feedback content is displayed, which can include at least two solutions as follows.

First, the feedback content is determined according to the cached related information of the touch operation and a response tactic sent from the server, and upon reaching a set point in time during a progress of playing video, the feedback content is displayed.

Second, the feedback content is determined according to the cached related information of the touch operation and a response tactic sent from the server, and upon detecting a touch operation on a preset control, the feedback content is displayed.

In an embodiment, the related information of the touch operation may include: at least one of an identifier of a touchable element corresponding to the touch operation, a time of playing video when the touch operation occurs, and attributes of a current user, thereby allowing that different touchable elements may correspond to different feedback contents, and one touchable element with various points in time of playing video and/or user attributes may correspond to different feedback contents. The identifier of a touchable element may include the name, serial number, display location, etc. of a touchable element. The attributes of the current user may include the name, gender and age of the current user, as well as portrait data obtained based on the operations of the user on the Internet, etc. Exemplarily, when the feedback content is determined according to the attributes of the current user and a preset response tactic, one touchable element with different user attributes may correspond to different feedback contents. For example, if the age in user attributes is smaller than a certain age value, the response mode can be playing music for children, and if the age in user attributes is greater than a certain age value, the response mode can be playing a song suitable for adults. Exemplarily, in addition to determining the feedback content according to the user attributes, the server may also determine a subsequently delivered touchable element and/or configuration information of the touchable element according to the user attributes, and the corresponding client receives the touchable element and/or the configuration information of the touchable element determined according to the user attributes subsequently sent from the server, and then returns to S120. Therefore, a series of touchable elements are delivered in the process of playing video, which correspond to a series of interactive activities which can be different according to different user attributes. As an embodiment, in a test scenario, a server may determine a touchable element to be delivered subsequently according to user attributes such as the age and education level of a user; for example, if the user has a poor education level, the questions in the test may be set in forms of choice questions or true-or-false questions, so that the degree of difficulty of the test can be reduced, and the user can better participate; and if the user has a high education level, the questions in the test may be set as completions, so that the degree of difficulty of the test is increased, and the test becomes more challenging for the user.

In an embodiment, when the feedback content is displayed, the process of playing video will not be interrupted; or, if the displayed feedback content includes a content in a preset category, the video can be paused to play, and if the displayed feedback content does not include a content in a preset category, the video can be determined not to be paused.

When the feedback content is displayed, the feedback content may be displayed on a browser page; or, the feedback content may be displayed on a video playing page; or, the feedback content may be displayed on a local page.

In an embodiment, the browser may be called via a preset control, and the feedback content may be displayed via a browser. The browser itself may also be a touchable element, which is automatically displayed at a certain point in time and requests server data to be displayed at specific time or under a specific condition.

In an embodiment, when the feedback content is displayed on a browser page, the browser page is displayed on the same screen with a video interface, and the browser page and the video interface partially overlap. When a browser page is displayed, it will not affect video playing, which means the video continues playing and will not be interrupted. In an embodiment, when a browser page is to be displayed, a WebView control can be created, a file, such as an HTML, XHTML, HTML5, CSS or javascript file carrying a feedback content sent from a server is parsed by the WebView control, and the parsed content is displayed via the WebView control. In an embodiment, to create the WebView control, a new process may be first created, and the WebView control is created by this process, and at this time, the new process and the process for playing the video are active at the same time. Alternatively, the WebView control may also be created by the process for playing video; that is, the process for creating the WebView control and the process for playing video are the same process.

It is also possible to pause to play video when the browser page is displayed and continue to play video when the browser page is closed. In an embodiment, when a browser page is popped up, a request message for stopping playing video can be sent via the browser to a control module of a terminal apparatus where a video playing application (i.e. a client playing video) resides, and the control module controls the video playing application (i.e. the client playing video) to pause to play video according to the request message.

It should be noted that whether to pause the video or not is controllable, which can be controlled either by the server or by the client.

If the server controls whether to pause the video or not when the browser page is displayed, it may be as follows. The server delivers a notification message indicating whether to pause the video when a browser page is displayed; the notification message may include flag information for indicating whether to pause the video or not when a browser page is displayed at any time in the process of playing video; or, the notification message may contain flag information for a touchable element displayed in the process of playing video; the flag information is used for indicating whether to pause the video or not when a browser page triggered by a corresponding touchable element is displayed; and the notification message may be sent from the server prior to or in the process of playing video, which may be delivered to the client together with configuration information of the touchable element. The client, after receiving the notification message sent from the server, determines whether to pause the video or not when the browser page is displayed according to the notification message. In an embodiment, the server may determine the flag information within the notification message according to whether the feedback content displayed in the browser page includes a content in a preset category or not. In an embodiment, if the feedback content displayed on the browser page includes a content in a preset category, the notification message will include flag information indicating to pause playing video, and if the feedback content displayed on the browser page does not include a content in a preset category, the notification message carries flag information indicating not to pause the video. In an embodiment, the content in a preset category may include the content in a video category and/or an audio category.

After the feedback content is displayed on the browser page, if a touch operation on a touchable element displayed on the browser page is detected, the touch operation can be responded. Namely, the detected touch operation on the touchable element displayed on the browser page is responded. In an embodiment, responding to the touch operation can include at least one of redirecting to a page, additionally displaying a new content on the browser page, and controlling the progress of playing video.

In an embodiment, one or more touchable elements are displayed on the browser page, and different touchable elements may correspond to different response modes or the same response mode.

Exemplarily, responding to the detected touch operation on the touchable element displayed on the browser page can include: determining a target point in time for adjusting the progress of playing video corresponding to the touchable element displayed on the browser page, sending the target point in time to an application playing the video via a browser, and adjusting the progress of playing video to the target point in time by the application playing the video.

The progress of playing video may be controlled in the following way.

The target point in time for adjusting the progress of playing video corresponding to the touchable element displayed on the browser page is determined according to the feedback content sent from the server; the target point in time is sent to an application playing the video via a browser, and the progress of playing video is adjusted to the target point in time by the application. The target point in time may be obtained from a response tactic corresponding to the touchable element displayed on the browser page; the response tactic may be delivered to the client by the server in advance; for example, the server can send the response tactic for the touchable element displayed on the browser together with the feedback content to be displayed on the browser page to the client.

In an embodiment, the feedback content may be generated by the server according to statistical data of touch operations performed by one or more users on the touchable element. For example, the feedback content may include: the number of touch operations performed by a user or a certain type of users or all users on the touchable element, such as the number of clicks performed by all users on a certain answer option. That is, the response tactic includes: generating the feedback content according to statistical data of touch operations performed by one or more users on the touchable element.

In this embodiment, the feedback content may also be determined by a predictive result of predicting the behavior of a current user based on a statistic result of touchable elements on which a current user has performed a touch operation and touchable elements on which the current user has not performed a touch operation performed by the server. That is, the response tactic includes: determining a touchable element on which a current user has performed a touch operation and a touchable element on which the current user has not performed a touch operation, predicting the behavior of the current user based on the touchable element on which the current user has performed a touch operation and the touchable element on which the current user has not performed a touch operation, and determining a feedback content according to a prediction result of the behavior of the current user.

In an embodiment, the method further includes: acquiring a touchable element to be displayed in the process of playing video and configuration information of the touchable element subsequently sent from the server.

The touchable element subsequently sent from the server to be displayed in the process of playing video and/or the subsequently delivered configuration information of the touchable element may be determined according to the prediction result; the prediction result is a result of predicting the behavior of the current user based on a touchable element on which the current user has performed a touch operation and a touchable element on which the current user has not performed a touch operation. For example, if it is determined according to the result of statistics that the number of times the current user has performed the touch operation on a touchable element is lower than a stated threshold, it can predict that the current user is less likely to perform a touch operation subsequently on the touchable element, and according to the prediction result, the touchable element will not be delivered any more or the number of times of subsequent delivering of the touchable element will be reduced; another example is if it is determined according to the result of statistics that the number of times the current user has performed the touch operation on a certain type of touchable elements is lower than a stated threshold, it can predict that the current user is less likely to perform a touch operation subsequently on this type of touchable elements, and according to the prediction result, this type of touchable elements will not be delivered any more or the number of times of subsequent delivering of this type of touchable elements will be reduced.

This embodiment may be applied to scenarios such as voting, testing, searching, shopping, etc.

In a voting scenario, voting options are displayed at a certain point in time in the process of playing video, and upon detecting a click by a user on a certain voting option, related information of the click operation is sent to a server; the server generates a file such as an HTML, XHTML, HTML5, CSS or javascript file according to the result of statistics of the number of votes corresponding to the voting options based on the received information, and the HTML, XHTML, HTML5, CSS or javascript file will be sent to the client; the client starts a browser and then displays a feedback content carried by the HTML, XHTML, HTML5, CSS or javascript file via the browser; the feedback content may include: you have successfully voted on XXX; currently, M users have voted on XXX, accounting for N % of the total number of voters, etc.

In a testing scenario, answer options of different questions are separately displayed at points in time in the process of playing video.

Upon detecting a click by a user on a certain answer option, an animation effect indicating that the answer option is received by a preset control is displayed; related information of the click operation is reported to a server, and the received related information is recorded by the server.

Upon reaching a setting point in time during a progress of playing video or upon detecting a click operation on the preset control such as a bag control, a response request is sent to a server; the server, after receiving the response request, generates a feedback content according to a preset feedback tactic and the recorded related information of the click operation by the user on the answer option, and delivers the feedback content to the client.

The client displays the feedback content in an open browser, which may include: whether each question is answered or not, and if the question is not answered, a "not answered" button may be displayed, and if the question has been answered, a button indicating whether the question is answered correctly or not may be displayed, and upon detecting the user to click a "correct" button, statistical information such as the total number and/or proportion of people who have answered the question correctly can be displayed; and upon detecting the user to click an "incorrect" button, statistical information such as the total number and/or proportion of people who have answered the question incorrectly as well as the correct answer and explanation are displayed; and upon detecting the user to click the "not answered" button, the progress of playing video may be controlled to a point in time where answer options of a question to be answered appear, so that the user can answer the question by clicking a corresponding answer option at this point in time. In an embodiment, before the progress of playing video is controlled to a point in time where answer options of a question to be answered appear, prompt information may be displayed to inquire the user whether to adjust the progress of playing video to the point in time to answer the question or not, and after the confirmation is selected by the user, the progress of playing video will be controlled to the point in time where answer options of the question to be answered appear.

In a searching scenario, a search icon is displayed beside a currently displayed person or article at a certain point in time in the process of playing video, and upon detecting a click by a user on the search icon, related information of the click operation is sent to a server; the server generates a search result of an objected to be searched according to the received information, and generates a file such as an HTML, XHTML, HTML5, CSS or javascript file according to the search result and delivers the HTML, XHTML, HTML5, CSS or javascript file to the client; the client starts a browser and then displays a feedback content carried by the HTML, XHTML, HTML5, CSS or javascript file via the browser; and the feedback content may include: a link corresponding to at least one search result of the object to be searched, and upon detecting the user to click a certain link, a corresponding webpage is redirected to display related information of the object to be searched.

In a shopping scenario, a "buy" icon is displayed beside a currently displayed article at a certain point in time in the process of playing video, and upon detecting a click by a user on the icon, related information of the click operation is sent to a server; the server acquires webpage information of an E-commerce website corresponding to the article according to the received information, and generates a file such as an HTML, XHTML, HTML5, CSS or javascript file according to webpage information and delivers the HTML, XHTML, HTML5. CSS or javascript file to the client; the client starts a browser and then displays a feedback content carried by the HTML. XHTML, HTML5, CSS or javascript file via the browser; and the feedback content may include: a webpage of the E-commerce website corresponding to the article that the user wants to purchase.

This embodiment may also be applied to the following scenario; for example, a special person appearing in a certain video (such as a video of an entertainment show) needs to be covered with mosaics, and in this scenario, an image with a mosaics effect may be delivered in the process of playing video, and used to cover the head of the special person; the image with the mosaics effect is not integrated in the video file in advance, but may be dynamically configured by the server according to the display time and/or the display location of the special person (the display time and/or the display location may be carried in the configuration information); and the server may deliver the configuration information to the client, and the client displays the mosaic image according to the configuration information. As another example, after a certain video (i.e., a video of an entertainment show) is produced, an advertising image is displayed on a preset location at a preset playing time in the process of playing video. As another example, in a process of playing a certain video (i.e., a video of an entertainment show), when a specific person (i.e., the host) appears at certain time in playing video, contact information of the host can be added over the host, and so on.

According to the technical scheme of this embodiment, the server may deliver a touchable element to be displayed and the configuration information of the touchable element at any time in the process of playing video so as to update the configuration information of the touchable element at any time, so that the touchable element can be dynamically configured and displayed in the process of playing video according to actual needs, which can improve the flexibility and diversity of the display of the touchable element, and the touch operation of the touchable element can be correspondingly responded, thereby improving the interactivity with the user in the process of playing video.

According to the technical scheme of this embodiment, a touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved. Besides, related information of touch operations may be collected in advance and then collectively displayed; therefore, the user can receive less interference during watching a video, and the participation and interactivity of the user in the process of playing video are improved, so that the interference and interactivity of the user during watching the video are balanced, and the watching experience of the user is improved.

Second Embodiment

Figure 2:
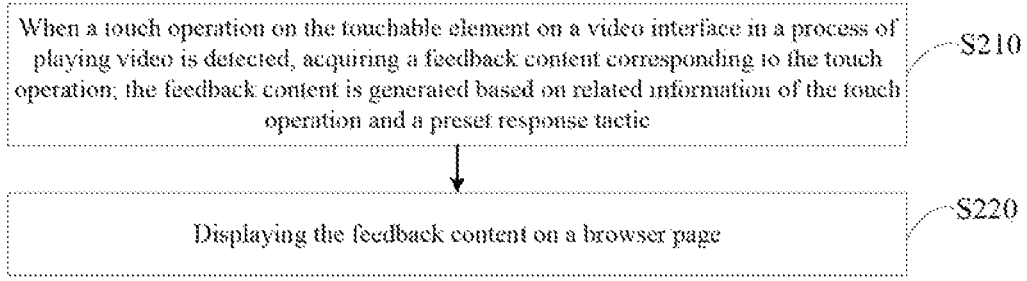
FIG. 2 is a flowchart of a method for displaying information on video provided by a second embodiment of the disclosure.

FIG. 2 shows a flowchart of a method of displaying information on video provided by the second embodiment of the disclosure, and this embodiment is applicable to the information displayed on a video interface. The method may be performed by an device of displaying information on video, which may be implemented in software and/or hardware, integrated in a terminal having a function of playing video, such as a smart phone, a tablet computer, etc. Referring to FIG. 2, the method includes the following steps.

S210, upon detecting a touch operation on the touchable element on a video interface in a process of playing video, a feedback content corresponding to the touch operation is acquired; the feedback content is generated based on related information of the touch operation and a preset response tactic.

In an embodiment, the touchable element may be displayed on the video interface in the following ways; a touchable element to be displayed in the process of playing video and configuration information of the touchable element sent from a server are acquired; and according to the configuration information of the touchable element, display time of the touchable element in the process of playing video and/or a display location of the touchable element on the video interface are determined, and the touchable element is displayed according to the display time and/or the display location.

In an embodiment, the touchable element on the video interface is not limited to being sent from the server, and any touchable element displayed on the video interface is included in the protective scope of the embodiment; for example, the touchable element may also be a clickable control added to the video in the process of producing video.

When the touchable element on the video interface is sent from the server, displaying the touchable element sent from the server can refer to the related description in the first embodiment above.

S220, the feedback content is displayed on a browser page.

In an embodiment, the feedback content is displayed on a browser page, which may be implemented as follows; a browser is started and popped up, and the feedback content is received, rendered and displayed by the browser. In an embodiment, the feedback content may be carried in a file such as an HTML, XHTML, HTML5, CSS, or javascript file, and after the browser is started, a WebView control is created to parse the HTML, XHTML, HTML5, CSS or javascript file, and the parsed content is displayed through the WebView control.

Exemplarily, after detecting a touch operation on the touchable element on a video interface in the process of playing video, the method further includes: collecting related information of the touch operation; correspondingly, acquiring a feedback content generated based on related information of the touch operation and a preset response tactic, and displaying the feedback content on a browser page includes: when preset conditions are satisfied, acquiring a feedback content determined based on the preset response tactic and the collected related information of the touch operation; and displaying the feedback content on the browser page; or, acquiring a feedback content generated based on the preset response tactic and the collected related information of the touch operation; when preset conditions are satisfied, displaying the feedback content via the browser.

In this embodiment, related information of the touch operation is collected, which may be implemented as follows; related information of the touch operation is reported to the server such that a feedback content is determined by the server based on a preset response tactic and the related information of the touch operation; specifically, related information of the touch operation is cached such that a feedback content is determined based on a preset response tactic and the related information of the touch operation in the client playing video.

In an embodiment, when preset conditions are satisfied, acquiring a feedback content determined based on the preset response tactic and the collected related information of the touch operation includes: when preset conditions are satisfied, receiving a feedback content sent from the server; the feedback content is generated by the server based on the preset response tactic and the received related information of the touch operation.

As an embodiment, a feedback content corresponding to the touch operation is acquired, which may be implemented as follows; related information of the touch operation is reported to a server; and a feedback content sent from the server is received; the feedback content is determined by the server according to the preset response tactic and the received related information of the touch operation.

This embodiment may also be implemented as follows; related information of the touch operation is reported to a server; when preset conditions are satisfied, a feedback content sent from the server can be received; and the feedback content is displayed on a browser page; the feedback content is generated by the server based on the preset response tactic and the received related information of the touch operation; or a feedback content generated according to the preset response tactic and the received related information of the touch operation sent from the server is acquired; when preset conditions are satisfied, the feedback content is displayed on a browser page.

Receiving the feedback content and displaying the feedback content can refer to related description in the first embodiment above.

In an embodiment, when preset conditions are satisfied, a feedback content sent from the server may be received, and the feedback content may be displayed on a browser page.

In an embodiment, when preset conditions are satisfied, a feedback content sent from the server can be received, and the feedback content is displayed on a browser page, which at least can include three solutions as follows.

First, upon reaching a set point in time in the process of playing video, a feedback content sent from the server is received and the feedback content is displayed on a browser page; or, a feedback sent from the server is received in advance, and upon reaching a set point in time during a progress of playing video, the feedback content is displayed on a browser page. For example, at initial time of playing video, all feedback contents that may be possibly delivered for the touchable element are received, and then the corresponding feedback content can be displayed when the touchable element is triggered by a user. As another example, the feedback content can be delivered when the touchable element is triggered by a user, but the feedback content is displayed after preset time or after a preset control is triggered.

Second, upon detecting a touch operation on a preset control, a response request is sent to the server, and a feedback content sent from the server according to the response request is received and displayed on a browser page. In an embodiment, the preset control may be displayed throughout the entire process of playing video, or displayed when preset conditions are satisfied.

In an embodiment, upon detecting a touch operation on the touchable element, the association/relevance display can be disposed between the touchable element and the preset control. For example, the association may be displayed with an animation effect (e.g. an animation effect that an arrow or a flash of lightning moves from the touchable element to the preset control at a certain speed) so as to prompt the user that the touch operation has been collected.

Third, upon reaching a set point in time during a progress of playing video, an interactive bar element is displayed based on information for displaying the interactive bar element sent from the server; and upon detecting a touch operation on the interactive bar element, a response request is sent to the server, and a feedback content sent from the server according to the response request is received, and the feedback content is displayed on a browser page. Alternatively, upon reaching a set point in time during a progress of playing video, information sent from the server for displaying an interactive bar element is received, and the interactive bar element is displayed according to the information, or information previously sent from the server for displaying the interactive bar element at a set point in time during a progress of playing video is received; if a touch operation on the interactive bar element by the user is detected within a set time period, a response request will be sent to the server, and a feedback content sent from the server according to the response request is received and displayed on a browser page; if no touch operation on the interactive bar element by the user is detected within the set time period, the interactive bar element will not be displayed. Here, the interactive bar element may be a touchable element, such as an image, a control, an animated image, etc.

In an embodiment, the response request, which is sent to the server upon detecting a touch operation on a preset control, may include the detected duration of the touch operation on the preset control, so that the server generates a feedback content according to the duration of the touch operation on the preset control, thereby achieving the effect of displaying the feedback content with different effects according to different durations of the touch operation on the preset control by the user.

In an embodiment, a feedback content generated based on the preset response tactic and the collected related information of the touch operation is acquired, and when preset conditions are satisfied, the feedback content is displayed on a browser page, which can at least include three solutions as follows.

First, the feedback content generated according to the preset response tactic and the received related information of the touch operation sent from the server is acquired, and the feedback content is displayed on a browser page upon reaching a set point in time during a progress of playing video. For example, after the server generates a feedback content based on the preset response tactic and the received related information of the touch operation, the feedback content is immediately sent to the client, and at end time of playing video, the client displays the received feedback content sent from the server on a browser page.

Second, the feedback content generated according to the preset response tactic and the received related information of the touch operation sent from the server is acquired, and the feedback content is displayed on a browser page upon detecting a touch operation on a preset control. The preset control may be displayed throughout the entire process of playing video, or displayed when preset conditions are satisfied; for example, the preset control is displayed when a preset point in time is reached/up, and the preset point in time may be a point in time at which the last touchable element is displayed, or another point in time. Upon detecting a touch operation on the touchable element, an association between the touchable element and the preset control may also be displayed.

Third, a feedback content generated according to the preset response tactic and the received related information of the touch operation sent from the server is acquired; upon reaching a set point in time during a progress of playing video, an interactive bar element is displayed based on information for displaying the interactive bar element sent from the server; and upon detecting a touch operation on the interactive bar element, the feedback content is displayed on a browser page. In an embodiment, the information of the interactive bar element may be sent from the server in advance, or sent from the server upon reaching a set point in time during a progress of playing video.

As another embodiment, a feedback content corresponding to the touch operation is acquired, which may be implemented as follows; the feedback content is determined according to the related information of the touch operation and a preset response tactic sent from the server. Exemplarily, the preset response tactic may be sent from the server to the client prior to displaying the touchable element, which may be delivered to the client prior to or in the process of playing video, or delivered to the client together with configuration information of the touchable element.

In an embodiment, when preset conditions are satisfied, acquiring a feedback content determined based on the preset response tactic and the collected related information of the touch operation includes: determining the feedback content according to the cached related information of the touch operation and a response tactic sent from the server when preset conditions are satisfied.

In an embodiment, a feedback content generated based on the preset response tactic and the collected related information of the touch operation is acquired, and when preset conditions are satisfied, the feedback content is displayed on a browser page, which can include: determining a feedback content according to the cached related information of the touch operation and a response tactic sent from the server; upon reaching a set point in time during a progress of playing video, the feedback content is displayed on a browser page; or, a feedback content is determined according to the cached related information of the touch operation and a response tactic sent from the server; upon detecting a touch operation on a preset control, the feedback content is displayed on a browser page.

This example may also be implemented as follows; related information of the touch operation is cached; when preset conditions are satisfied, a feedback content can be determined according to the cached related information of the touch operation and a response tactic sent from the server; and the feedback content is displayed on a browser page; or a feedback content is determined according to the cached related information of the touch operation and a response tactic sent from the server; and when preset conditions are satisfied, the feedback content is displayed on a browser page.

In an embodiment, when preset conditions are satisfied, the feedback content is determined according to the cached related information of the touch operation and a response tactic sent from the server, which at least can include two solutions as follows.

First, upon reaching a set point in time during a progress of playing video, the feedback content is determined according to the cached related information of the touch operation and a response tactic sent from the server.

Second, upon detecting a touch operation on a preset control, the feedback content is determined according to the cached related information of the touch operation and a response tactic sent from the server. This mode may be as follows; upon detecting a touch operation on a preset control, a feedback content is determined according to the duration of the touch operation on the preset control, the cached related information of the touch operation and a response tactic sent from the server, thereby achieving the effect of displaying the feedback content with different effects according to different durations of the touch operation on the preset control by the user.

In an embodiment, the feedback content is determined according to the cached related information of the touch operation and a response tactic sent from the server; and when preset conditions are satisfied, the feedback content is displayed on a browser page, which at least can include two solutions as follows.

First, the feedback content is determined according to the cached related information of the touch operation and a response tactic sent from the server, and upon reaching a set point in time during a progress of playing video, the feedback content is displayed on a browser page.

Second, the feedback content is determined according to the cached related information of the touch operation and a response tactic sent from the server, and upon detecting a touch operation on a preset control, the feedback content is displayed on a browser page.

In an embodiment, the related information of the touch operation may include: at least one of an identifier of a touchable element corresponding to the touch operation, time of playing video when the touch operation occurs, and attributes of a current user, thereby allowing that different touchable elements may correspond to different feedback contents, and one touchable element with various periods of playing video and user attributes may correspond to different feedback contents. The identifier of a touchable element may include the name, serial number, display location, etc. of a touchable element. The attributes of the current user may include the name, gender and age of the current user, and portrait data obtained based on the operations of the user on the Internet, etc.

Exemplarily, in addition to determining the feedback content according to the user attributes, the server may also determine a subsequently delivered touchable element and/or configuration information of the touchable element according to the user attributes, and displaying the subsequently delivered touchable element can be referred to related description in the first embodiment above.

In an embodiment, when the feedback content is displayed on a browser page, the browser page can be displayed on the same screen with a video interface, and the browser page and the video interface partially overlap. When a browser page is displayed, the process of playing video will not be affected, namely keeping playing video, or the process of playing video will not be interrupted.

In an embodiment, the feedback content is displayed on a browser page, which may be implemented as follows; a new process is created; a WebView control is created by the new process, and the feedback content is displayed through the WebView control; or, a WebView control is created by a process for playing the video, and the feedback content is displayed through the WebView control. This scheme can refer to the related description in the first embodiment above.

The process of playing video can be paused when the browser page is displayed, and the video will continue to be played when the browser page is closed. It should be noted that whether to pause to play video or not is controllable, e.g. by the server or by the client, and the specific control scheme can be referred to related description in the first embodiment descried above.

After the feedback content is displayed on the browser page, if a touch operation on a touchable element displayed on the browser page is detected, the touch operation can be responded, namely responding to the detected touch operation on the touchable element displayed on the browser page. In an embodiment, responding to the touch operation includes: at least one of redirecting to a page, additionally displaying a new content on the browser page, and controlling the progress of playing video.

In an embodiment, one or more touchable elements are displayed on the browser page, and different touchable elements may correspond to different response modes or the same response mode.

Exemplarily, responding to the detected touch operation on the touchable element displayed on the browser page includes: determining a target point in time for adjusting the progress of playing video corresponding to the touchable element displayed on the browser page, sending the target point in time to an application playing the video via a browser, and the progress of playing video is adjusted to the target point in time by the application playing the video.

Controlling the progress of playing video can be referred to related description in the first embodiment above.

In this embodiment, the response tactic may be as follows; the feedback content is generated according to statistical data of touch operations performed by one or more users on the touchable element. For example, the feedback content may include: the number of touch operations performed by a user or a certain type of users or all users on the touchable element, such as the number of clicks performed by all users on a certain answer option.

In an embodiment, the feedback content may also be determined by a predictive result of predicting the behavior of a current user based on a statistic result of touchable elements on which a current user has performed a touch operation and touchable elements on which the current user has not performed a touch operation performed by the server. That is, the response tactic includes: determining a touchable element on which a current user has performed a touch operation and a touchable element on which the current user has not performed a touch operation, predicting the behavior of the current user based on the touchable element on which the current user has performed a touch operation and the touchable element on which the current user has not performed a touch operation, and determining a feedback content according to a prediction result of the behavior of the current user.

In an embodiment, the touchable element is be displayed, which may be implemented as follows; a touchable element to be displayed in the process of playing video and configuration information of the touchable element sent from a server are acquired; the delivered touchable element and/or the subsequently delivered configuration information of the touchable element can be determined according to a prediction result, and the prediction result, is a result of predicting the behavior of a current user based on a touchable element on which the current user has performed a touch operation and a touchable element on which the current user has not performed a touch operation; and according to the configuration information of the touchable element, display time of the touchable element in the process of playing video and a display location of the touchable element on the video interface are determined, and the touchable element is displayed according to the display time and the display location.

This embodiment may be applied to scenarios such as voting, testing, searching, shopping, etc. Examples of applications for each scenario can refer to related description in the first embodiment above.

According to the technical scheme of this embodiment, upon detecting a touch operation on the touchable element, the touch operation is responded by displaying, on a browser page, the feedback content generated based on related information of the touch operation and a preset response tactic. Compared with a local page, the content displayed on the browser can be freely updated and expanded according to actual needs, so that the flexibility and diversity of the displayed content are improved, and the interactivity with the user in the process of playing video is enhanced.

According to the technical scheme of this embodiment, the server may deliver a touchable element to be displayed and the configuration information of the touchable element at any time in the process of playing video so as to update the configuration information of the touchable element at any time, so that the touchable element can be dynamically configured and displayed in the process of playing video according to actual needs, thereby improving the flexibility and diversity of the display of the touchable element. A touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved. Besides, related information of touch operations may be collected in advance and then collectively displayed; therefore, the user can receive less interference during watching a video, and the participation and interactivity of the user in the process of playing video are improved, so that the interference and interactivity of the user during watching the video are balanced, and the watching experience of the user is improved.

Third Embodiment

Figure 3:
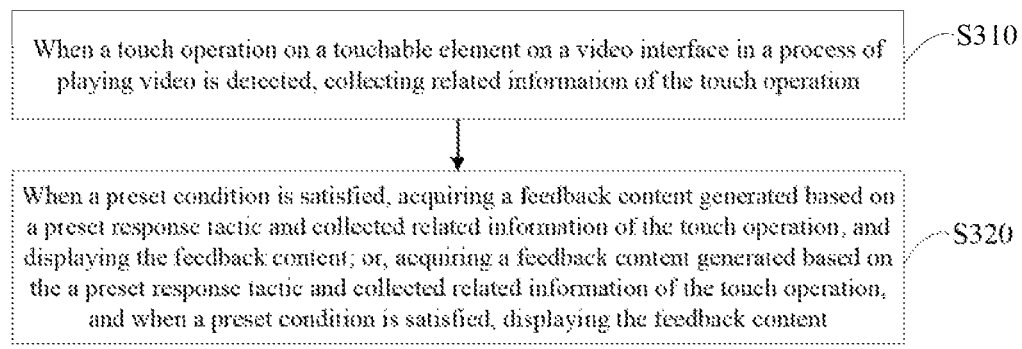
FIG. 3 is a flowchart of a method for displaying information on video provided by a third embodiment of the disclosure.

FIG. 3 shows a flowchart of a method of displaying information on video provided by a third embodiment of the disclosure, and this embodiment is applicable to the case where information is displayed on a video interface. The method may be performed by an device for displaying information on a video, which may be implemented in software and/or hardware, integrated in a terminal having a function of playing video, such as a smart phone, a tablet computer, etc. Referring to FIG. 3, the method includes the following steps.

S310, upon detecting a touch operation on the touchable element on a video interface in the process of playing video, related information of the touch operation is collected.

In an embodiment, the touchable element may be displayed on the video interface in the following ways; a touchable element to be displayed in the process of playing video and configuration information of the touchable element sent from a server are acquired; and according to the configuration information of the touchable element, display time of the touchable element in the process of playing video and/or a display location of the touchable element on the video interface are determined, and the touchable element is displayed according to the display time and/or the display location.

In an embodiment, the touchable element on the video interface is not limited to being sent from the server, and any touchable element displayed on the video interface is included in the protective scope of the embodiment; for example, the touchable element may also be a clickable control added to the video in the process of producing video.

When the touchable element on the video interface is sent from the server, displaying the touchable element sent from the server can refer to the related description in the first embodiment above.

In an embodiment, related information of the touch operation is collected, which may be implemented as follows; related information of the touch operation is reported to a server, and the server records the received related information of the touch operation; or, related information of the touch operation is cached locally.

S320, when preset conditions are satisfied, a feedback content determined based on the preset response tactic and the collected related information of the touch operation is acquired; and the feedback content is displayed; or, a feedback content generated based on the preset response tactic and the collected related information of the touch operation is acquired, and when preset conditions are satisfied, the feedback content can be displayed.

In an embodiment, the step S320 may include the following steps S3210 and S3220.

S3210, the feedback content is acquired; the feedback content is generated according to a preset response tactic and the collected related information of the touch operation. In an embodiment, a feedback content is acquired, which may be implemented as follows; a feedback content generated according to the preset response tactic and the received related information of the touch operation sent from the server is acquired. For example, after the server generates a feedback content based on the preset response tactic and the received related information of the touch operation, the feedback content is immediately sent to the client. Alternatively, the feedback content is determined according to the cached related information of the touch operation and a preset response tactic sent from the server.

S3220, upon detecting a touch operation on a preset control, the feedback content is displayed. For example, the feedback content may be displayed on a browser page, or a local page, or on a video interface.

The steps S3210 and S3220 may also be implemented as follows. S3210, upon detecting a touch operation on a preset control, the feedback content is acquired; the feedback content is a feedback content to be displayed which is generated according to a preset response tactic and the collected related information of the touch operation; S3220, the feedback content is displayed.

In an embodiment, a feedback content is acquired, which may be implemented as follows; a response request is sent to the server, and a feedback content sent from the server according to the response request is received and displayed; the feedback content is generated by the server according to the recorded related information of the touch operation and a preset response tactic. In an embodiment, the preset control may be displayed throughout the entire process of playing video, or displayed when preset conditions are satisfied. In an embodiment, the response request may include the detected duration of the touch operation on the preset control, so that the server generates a feedback content according to the duration of the touch operation on the preset control, thereby achieving the effect of displaying the feedback content with different effects according to different durations of the touch operation on the preset control by the user. Alternatively, the feedback content is determined according to the cached related information of the touch operation and a preset response tactic sent from the server.

In an embodiment, related information of the touch operation is collected, which may be implemented as follows; related information of the touch operation is reported to a server.

If the related information of the touch operation is collected by reporting the related information of the touch operation to a server, as an embodiment, when preset conditions are satisfied, the feedback content can be acquired; the feedback content is generated according to a preset response tactic and the collected related information of the touch operation. In other words, when preset conditions are satisfied, a feedback content determined based on the preset response tactic and the collected related information of the touch operation is acquired, which may be implemented as follows: when preset conditions are satisfied, a feedback content sent from the server is received; the feedback content is generated by the server based on the preset response tactic and the received related information of the touch operation.

Receiving the feedback content and displaying the feedback content can be referred to related description in the first embodiment above.

In an embodiment, when preset conditions are satisfied, receiving a feedback content sent from the server at least can include three solutions as follows.

First, upon reaching a set point in time during a progress of playing video, a feedback content sent from the server is received. Receiving the feedback content can be referred to related description in the first embodiment above.

Second, upon detecting a touch operation on a preset control, a response request is sent to the server, and a feedback content sent from the server according to the response request is received. The preset control may be displayed throughout the entire process of playing video, or displayed when preset conditions are satisfied; for example, the preset control can be displayed when a preset point in time is reached, and the preset point in time may be a point in time at which the first touchable element is displayed, or another point in time.

In an embodiment, upon detecting a touch operation on the touchable element, an association between the touchable element and the preset control may be displayed. For example, the association may be displayed with an animation effect (e.g. an animation effect that an arrow or a flash of lightning moves from the touchable element to the preset control at a certain speed) so as to prompt the user that the touch operation has been collected, and inform the user that a corresponding feedback content can be obtained by performing the touch operation on the preset control.

Third, upon reaching a set point in time during a progress of playing video, an interactive bar element is displayed based on information for displaying the interactive bar element sent from the server; and upon detecting a touch operation by a user on the interactive bar element, a response request is sent to the server, and a feedback content sent from the server according to the response request is received. Alternatively, upon reaching a set point in time during a progress of playing video, the interactive bar element is displayed according to information sent from the server for displaying an interactive bar element, or information previously sent from the server for displaying the interactive bar element at a set point in time during a progress of playing video is received; and if a touch operation on the interactive bar element by the user is detected within a set time period, a response request is sent to the server, and a feedback content sent from the server according to the response request is received and displayed (i.e., the feedback content is displayed on a browser page). Of course, the feedback content can further be determined based on a response tactic sent from the server in advance, and the feedback content is displayed; and if no touch operation on the interactive bar element by the user is detected within the set time period, the display of the interactive bar element is canceled. In an embodiment, the interactive bar element may be a touchable element in this embodiment, such as an image, a control, an animated image, etc.

In an embodiment, the response request may include a detected duration of the touch operation on the preset control, so that the server can generate a feedback content according to the duration of the touch operation on the preset control, thereby achieving the effect of displaying the feedback content with different effects according to different durations of the touch operation on the preset control by the user.

As another embodiment, a feedback content determined based on the preset response tactic and the collected related information of the touch operation is acquired, and when preset conditions are satisfied, the feedback content can be displayed, which can include three solutions as follows.

First, the feedback content generated according to the preset response tactic and the received related information of the touch operation sent from the server is acquired, and the feedback content is displayed upon reaching a set point in time during a progress of playing video. Displaying the feedback content can be referred to related description in the first embodiment above.

Second, the feedback content generated according to the preset response tactic and the received related information of the touch operation sent from the server is acquired, and the feedback content is displayed upon detecting a touch operation on a preset control. The preset control may be displayed throughout the entire process of playing video, or displayed when preset conditions are satisfied; for example, the preset control is displayed when a preset point in time is reached, and the preset point in time may be a point in time at which the last touchable element is displayed, or another point in time. In an embodiment, upon detecting a touch operation on the touchable element, an association between the touchable element and the preset control may also be displayed.

Third, a feedback content generated according to the preset response tactic and the received related information of the touch operation sent from the server is acquired; upon reaching a set point in time during a progress of playing video, an interactive bar element is displayed based on information for displaying the interactive bar element sent from the server; and upon detecting a touch operation on the interactive bar element, the feedback content is displayed. In an embodiment, the information of the interactive bar element may be sent from the server in advance, or sent from the server upon reaching a set point in time during a progress of playing video.

In an embodiment, related information of the touch operation is collected, which may be implemented as follows; related information of the touch operation is cached.

If the related information of the touch operation is collected by caching the related information of the touch operation, as an embodiment, when preset conditions are satisfied, a feedback content determined based on the preset response tactic and the collected related information of the touch operation is acquired, which may be implemented as follows; when preset conditions are satisfied, a feedback content is determined according to the cached related information of the touch operation and a response tactic sent from the server. Exemplarily, the preset response tactic may be sent from the server to the client prior to displaying the touchable element, which can be delivered to the client prior to or in the process of playing video, or delivered to the client together with configuration information of the touchable element.

In an embodiment, when preset conditions are satisfied, the feedback content is determined according to the cached related information of the touch operation and a response tactic sent from the server, which at least can include two solutions as follows.

First, upon reaching a set point in time during a progress of playing video, the feedback content is determined according to the cached related information of the touch operation and a response tactic sent from the server.

Second, upon detecting a touch operation on a preset control, the feedback content is determined according to the cached related information of the touch operation and a response tactic sent from the server. This mode may be as follows: upon detecting a touch operation on a preset control, a feedback content is determined according to the duration of the touch operation on the preset control, the cached related information of the touch operation and a response tactic sent from the server, thereby achieving the effect of displaying the feedback content with different effects according to different durations of the touch operation on the preset control by the user.

As another embodiment, a feedback content determined based on the preset response tactic and the collected related information of the touch operation is acquired, and when preset conditions are satisfied, the feedback content is displayed, which can include two solutions as follows.

First, the feedback content is determined according to the cached related information of the touch operation and a response tactic sent from the server, and upon reaching a set point in time during a progress of playing video, the feedback content is displayed.

Second, the feedback content is determined according to the cached related information of the touch operation and a response tactic sent from the server, and upon detecting a touch operation on a preset control, the feedback content is displayed.

In an embodiment, the related information of the touch operation may include: at least one of an identifier of a touchable element corresponding to the touch operation, time of playing video when the touch operation occurs, and attributes of a current user, thereby allowing that different touchable elements may correspond to different feedback contents, and one touchable element with various time of playing video and user attributes may correspond to different feedback contents. The identifier of a touchable element may include the name, serial number, display location, etc. of a touchable element. The attributes of the current user may include the name, gender and age of the current user, and portrait data obtained based on the operations of the user on the Internet, etc.

Exemplarily, in addition to determining the feedback content according to the user attributes, the server may also determine a subsequently delivered touchable element and/or configuration information of the touchable element according to the user attributes, and displaying the subsequently delivered touchable element can be referred to related description in the first embodiment above.

When the feedback content is displayed, the feedback content may be displayed on a browser page; or, the feedback content may be displayed on a page playing video; or, the feedback content may be displayed on a local page.

In an embodiment, when the feedback content is displayed on a browser page, the browser page can be displayed on the same screen with a video interface, and the browser page and the video interface partially overlap. When a browser page is displayed, the process of playing video will not be affected, namely keeping playing video without interruption.

Displaying the feedback content on a browser page can be referred to related description in the first embodiment above.

In an embodiment, the feedback content may also be determined by a predictive result of predicting the behavior of a current user based on a statistic result of touchable elements on which a current user has performed a touch operation and touchable elements on which the current user has not performed a touch operation performed by the server. That is, the response tactic includes: determining a touchable element on which a current user has performed a touch operation and a touchable element on which the current user has not performed a touch operation, predicting the behavior of the current user based on the touchable element on which the current user has performed a touch operation and the touchable element on which the current user has not performed a touch operation, and determining a feedback content according to a prediction result of the behavior of the current user.

In an embodiment, the touchable element is displayed, which may be implemented as follows: a touchable element to be displayed in the process of playing video and configuration information of the touchable element sent from a server are acquired, and the delivered touchable element and/or the subsequently delivered configuration information of the touchable element can be determined according to a prediction result, and the prediction result is a result of predicting the behavior of a current user based on a touchable element on which the current user has performed a touch operation and a touchable element on which the current user has not performed a touch operation; and according to the configuration information of the touchable element, display time of the touchable element in the process of playing video and a display location of the touchable element on the video interface are determined, and the touchable element is displayed according to the display time and the display location.

This embodiment may be applied to scenarios such as voting, testing, searching, shopping, etc. Examples of applications for each scenario can be referred to related description in the first embodiment above.

According to the technical scheme of this embodiment, upon detecting a touch operation on the touchable element, related information of the touchable element is firstly collected, then when preset conditions are satisfied, feedback contents generated based on the related information of the touch operation and a preset response tactic can be collectively displayed; therefore, the user can receive less interference during watching a video, and the participation and interactivity of the user in the process of playing video are improved, so that the interference and interactivity of the user watching the video are balanced, and the watching experience of the user is improved.

According to the technical scheme of this embodiment, the server may deliver a touchable element to be displayed and the configuration information of the touchable element at any time in the process of playing video so as to update the configuration information of the touchable element at any time, so that the touchable element can be dynamically configured and displayed in the process of playing video according to actual needs, thereby improving the flexibility and diversity of the display of the touchable element. A touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved.

Fourth Embodiment

Figure 4:
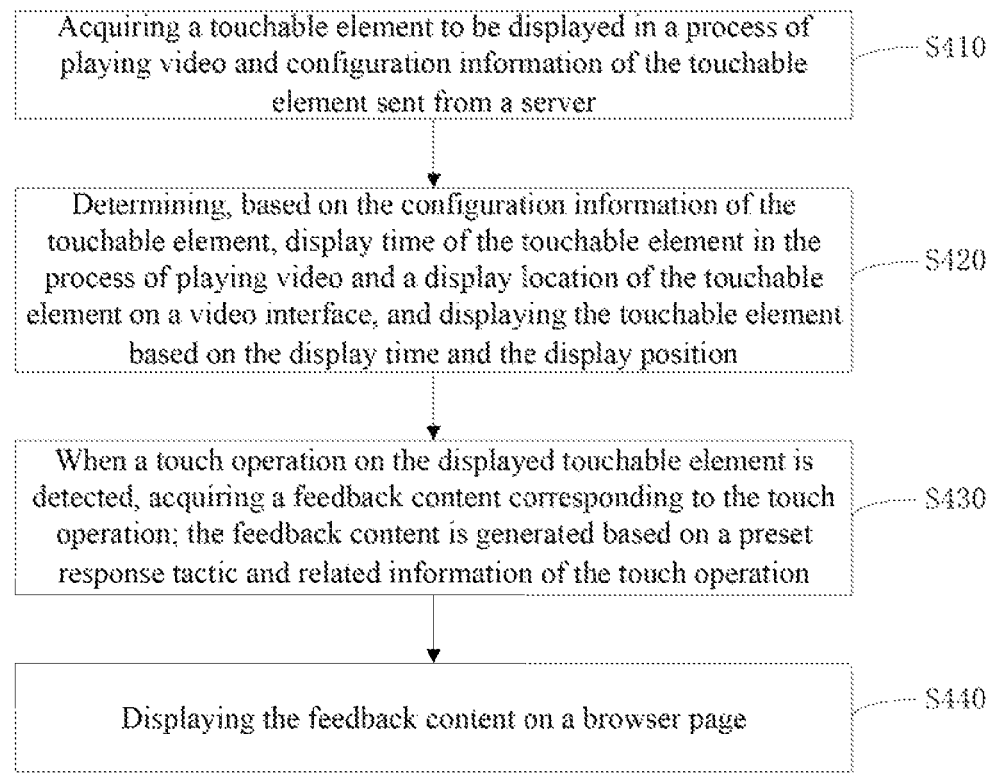
FIG. 4 is a flowchart of a method for displaying information on video provided by a fourth embodiment of the disclosure.

FIG. 4 shows a flowchart of a method of displaying information on video provided by a fourth embodiment of the disclosure, and this embodiment is applicable to the information displayed on a video interface. The method may be performed by an device for displaying information on video, which may be implemented in software and/or hardware, integrated in a terminal having a function of playing video, such as a smart phone, a tablet computer, etc. Referring to FIG. 4, the method includes the following steps.

S410, a touchable element to be displayed in the process of playing video and configuration information of the touchable element sent from a server are acquired.

In an embodiment, acquiring the touchable element sent from the server can be referred to related description in the first embodiment above.

S420, according to the configuration information of the touchable element, display time of the touchable element in the process of playing video and/or a display location of the touchable element on a video interface can be determined, and the touchable element is displayed according to the display time and/or the display position.

In an embodiment, displaying the touchable element according to the display time and the display location can be referred to related description in the first embodiment above.

S430, upon detecting a touch operation on the displayed touchable element, a feedback content corresponding to the touch operation is acquired; the feedback content is generated according to a preset response tactic and related information of the touch operation.

In an embodiment, the touch operation may include: contact interaction operations on the touchable element, and contactless interaction operations such as voice operations and the like; for example, contact interaction operations may include click operations and/or slide operations.

In an embodiment, a feedback content corresponding to the touch operation is acquired, which may be implemented as follows: related information of the touch operation is reported to a server, and the server records the received related information of the touch operation, and upon detecting a touch operation on a preset control, a response request is sent to the server, and a feedback content sent from the server is received; the feedback content is generated by the server according to a preset response tactic and the recorded related information of the touch operation; or, related information of the touch operation is cached locally; and upon detecting a touch operation on a preset control, a feedback content is determined according to a preset response tactic sent from the server in advance and the cached related information of the touch operation.

S440, the feedback content is displayed on a browser page.

In an embodiment, displaying the feedback content on a browser page can be referred to related description in the first embodiment above.

Exemplarily, after detecting the touch operation on the displayed touchable element, the method further includes: collecting related information of the touch operation; correspondingly, a feedback content corresponding to the touch operation is acquired, and the feedback content is displayed on a browser page, which can include: when preset conditions are satisfied, acquiring a feedback content corresponding to the touch operation; and the feedback content is displayed on a browser page; or, a feedback content corresponding to the touch operation is acquired; and when preset conditions are satisfied, the feedback content is displayed on a browser page.

In this embodiment, related information of the touch operation is collected, which may be implemented as follows: related information of the touch operation is reported to the server such that a feedback content is determined by the server based on a preset response tactic and the related information of the touch operation; or related information of the touch operation is cached such that a feedback content is determined based on a preset response tactic and the related information of the touch operation in the client playing video. Collecting related information of the touch operation can be referred to related description in the first embodiment above.

This embodiment may be applied to scenarios such as voting, testing, searching, shopping, etc. Examples of applications for each scenario can be referred to related description in the first embodiment above.

According to the technical scheme of this embodiment, a touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved. Besides, related information of touch operations may be collected in advance and then collectively displayed; therefore, the user can receive less interference during watching a video, and the participation and interactivity of the user in the process of playing video are improved, so that the interference and interactivity of the user during watching the video are balanced, and the watching experience of the user is improved.

Fifth Embodiment

Figure 5:
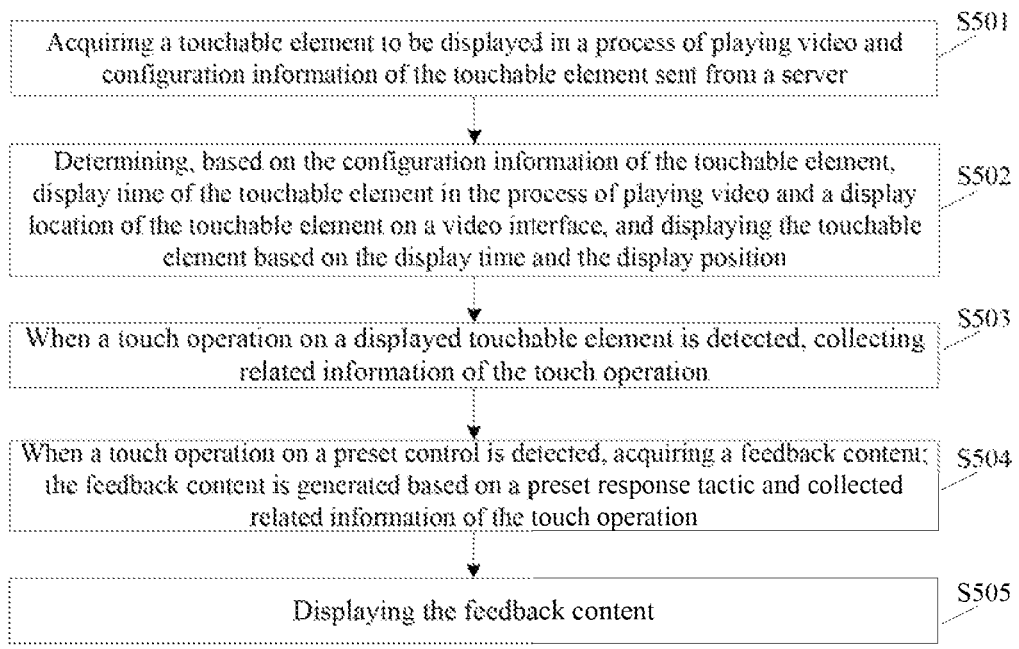
FIG. 5 is a flowchart of a method for displaying information on video provided by a fifth embodiment of the disclosure.

FIG. 5 shows a flowchart of a method of displaying information on video provided by a fifth embodiment of the disclosure, and this embodiment is applicable to the information displayed on a video interface. The method may be performed by an device for displaying information on video, which may be implemented in software and/or hardware, integrated in a terminal having a function of playing video, such as a smart phone, a tablet computer, etc. Referring to FIG. 5, the method includes the following steps.

S510, a touchable element to be displayed in the process of playing video and configuration information of the touchable element sent from a server are acquired.

In an embodiment, acquiring the touchable element sent from the server can be referred to related description in the first embodiment above.

S520, according to the configuration information of the touchable element, display time of the touchable element in the process of playing video and/or a display location of the touchable element on a video interface can be determined, and the touchable element is displayed according to the display time and/or the display position.

In an embodiment, displaying the touchable element according to the display time and the display location can be referred to related description in the first embodiment above.

S530, upon detecting the touch operation on the displayed touchable element, related information of the touch operation is collected.

In an embodiment, related information of the touch operation is collected, which may be implemented as follows: related information of the touch operation is reported to a server, and the server records the received related information of the touch operation; or, related information of the touch operation is cached locally.

S540, upon detecting a touch operation on a preset control, the feedback content is acquired; the feedback content is generated according to a preset response tactic and the collected related information of the touch operation.

In an embodiment, acquiring the feedback content can be referred to related description in the first embodiment above.

S550, the feedback content is displayed.

In an embodiment, the feedback content may be displayed on a browser page, or a local page, or on a video interface. Displaying the feedback content on a browser page can be referred to related description in the first embodiment above.

After the feedback content is displayed on the browser page, if a touch operation on a touchable element displayed on the browser page is detected, the touch operation can be responded, which can be referred to related description in the first embodiment above.

This embodiment may be applied to scenarios such as voting, testing, searching, shopping, etc. Examples of applications for each scenario can be referred to related description in the first embodiment above.

According to the technical scheme of this embodiment, the server may deliver a touchable element to be displayed and the configuration information of the touchable element at any time in the process of playing video so as to update the configuration information of the touchable element at any time, so that the touchable element can be dynamically configured and displayed in the process of playing video according to actual needs, thereby improving the flexibility and diversity of the display of the touchable element. Besides, related information of touch operations may be collected in advance and then collectively displayed; therefore, the user receives less interference during watching a video, and the participation and interactivity of the user in the process of playing video are improved, so that the interference and interactivity of the user watching the video are balanced, and the watching experience of the user is improved.

According to the technical scheme of this embodiment, a touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved.

Sixth Embodiment

Figure 6:
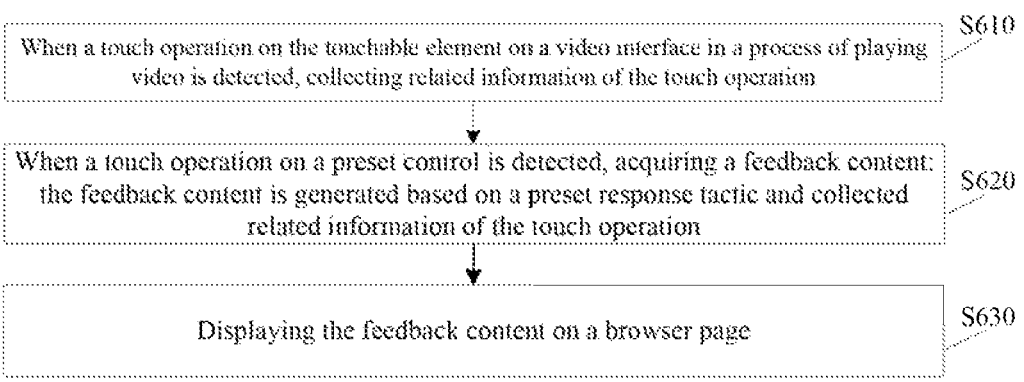
FIG. 6 is a flowchart of a method for displaying information on video provided by a sixth embodiment of the disclosure.

FIG. 6 shows a flowchart of a method of displaying information on video provided by a sixth embodiment of the disclosure, and this embodiment is applicable to the information displayed on a video interface. The method may be performed by an device for displaying information on video, which may be implemented in software and/or hardware, integrated in a terminal having a function of playing video, such as a smart phone, a tablet computer, etc. Referring to FIG. 6, the method includes the following steps.

S610, upon detecting a touch operation on the touchable element on a video interface in the process of playing video, related information of the touch operation is collected.

In an embodiment, the touchable element may be displayed on the video interface in the following ways: a touchable element to be displayed in the process of playing video and configuration information of the touchable element sent from a server are acquired; and according to the configuration information of the touchable element, display time of the touchable element in the process of playing video and/or a display location of the touchable element on the video interface can be determined, and the touchable element is displayed according to the display time and/or the display location.

In an embodiment, the touchable element on the video interface is not limited to being sent from the server, and any touchable element displayed on the video interface is included in the protective scope of the embodiment; for example, the touchable element may also be a clickable control added to the video in the production of the video.

When the touchable element on the video interface is sent from the server, displaying the touchable element sent from the server can be referred to the related description in the first embodiment above.

In an embodiment, related information of the touch operation is collected, which may be implemented as follows: related information of the touch operation is reported to a server, and the server records the received related information of the touch operation; or, related information of the touch operation is cached locally.

S620, upon detecting a touch operation on a preset control, the feedback content is acquired; the feedback content is generated according to a preset response tactic and the collected related information of the touch operation.

In an embodiment, acquiring the feedback content can be referred to related description in the first embodiment above.

S630, the feedback content is displayed on a browser page.

In an embodiment, displaying the feedback content on a browser page can be referred to related description in the first embodiment above.

This embodiment may be applied to scenarios such as voting, testing, searching, shopping, etc. Examples of applications for each scenario can be referred to related description in the first embodiment above.

According to the technical scheme of this embodiment, upon detecting a touch operation on the touchable element, related information of the touchable element is firstly collected, then feedback contents generated based on the related information of the touch operations and a preset response tactic are collectively displayed; therefore, the user receives less interference during watching a video, and the participation and interactivity of the user in the process of playing video are improved, thereby improving the watching experience of the user. In addition, upon detecting a touch operation on the touchable element, a feedback content generated based on related information of the touch operation and a preset response tactic is displayed on a browser page. Compared with a local page, the content displayed on the browser can be freely updated and expanded according to actual needs, so that the flexibility and diversity of the displayed content are improved, and the interactivity with the user in the process of playing video is enhanced.

According to the technical scheme of this embodiment, the server may deliver a touchable element to be displayed and the configuration information of the touchable element at any time in the process of playing video so as to update the configuration information of the touchable element at any time, so that the touchable element can be dynamically configured and displayed in the process of playing video according to actual needs, thereby improving the flexibility and diversity of the display of the touchable element. A touchable element with any content can be displayed with any display effect at any time and any location in the process of playing video, and the content, display effect, display time, display location, etc. of the touchable element can be updated at any time according to the need of the service, thereby achieving deep interaction with the user; besides, compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved.

Seventh Embodiment

Figure 7:
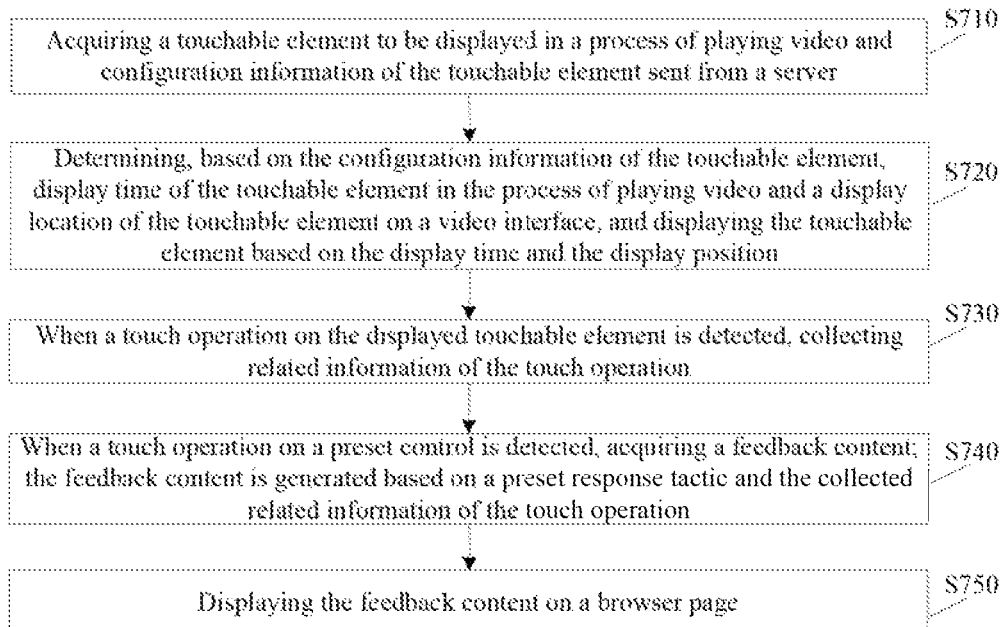
FIG. 7 is a flowchart of a method for displaying information on video provided by a seventh embodiment of the disclosure.

FIG. 7 shows a flowchart of a method of displaying information on video provided by a seventh embodiment of the disclosure, and this embodiment is applicable to the information displayed on a video interface. The method may be performed by an device for displaying information on video, which may be implemented in software and/or hardware, integrated in a terminal having a function of playing video, such as a smart phone, a tablet computer, etc. Referring to FIG. 7, the method includes the following steps.

S710, a touchable element to be displayed in the process of playing video and configuration information of the touchable element sent from a server are acquired.

In an embodiment, acquiring the touchable element sent from the server can be referred to related description in the first embodiment above.

S720, according to the configuration information of the touchable element, display time of the touchable element in the process of playing video and/or a display location of the touchable element on a video interface can be determined, and the touchable element is displayed according to the display time and/or the display position.

In an embodiment, displaying the touchable element according to the display time and the display location can be referred to related description in the first embodiment above.

S730, upon detecting the touch operation on the displayed touchable element, related information of the touch operation is collected.

In an embodiment, related information of the touch operation is collected, which may be implemented as follows: related information of the touch operation is reported to a server, and the server records the received related information of the touch operation; or, related information of the touch operation is cached locally.

S740, upon detecting a touch operation on a preset control, a feedback content is acquired; the feedback content is generated according to a preset response tactic and the collected related information of the touch operation.

In an embodiment, acquiring the feedback content can be referred to related description in the first embodiment above.

S750, the feedback content is displayed on a browser page.

In an embodiment, displaying the feedback content on a browser page can be referred to related description in the first embodiment above.

This embodiment may be applied to scenarios such as voting, testing, searching, shopping, etc. Examples of applications for each scenario can be referred to related description in the first embodiment above.

According to the technical scheme of this embodiment, a touchable element with any content can be displayed with any display effect at any time and any location in the process of playing video, and the content, display effect, display time, display location, etc. of the touchable element can be updated at any time according to the need of the service, thereby achieving deep interaction with the user; Besides, related information of touch operations may be collected in advance and then feedback contents are collectively displayed; therefore, the user receives less interference during watching a video, and the participation and interactivity of the user in the process of playing video are improved, so that the interference and interactivity of the user during watching the video are balanced, and the watching experience of the user is improved. Compared with displaying the feedback content on the local page, the feedback content is displayed via a browser, which can use the webpage technology for display, and various contents can be produced and displayed according to the actual needs by using the webpage technology, so that the abundance and the customizability of the displayed content can be greatly improved.

Eighth Embodiment

Figure 8:
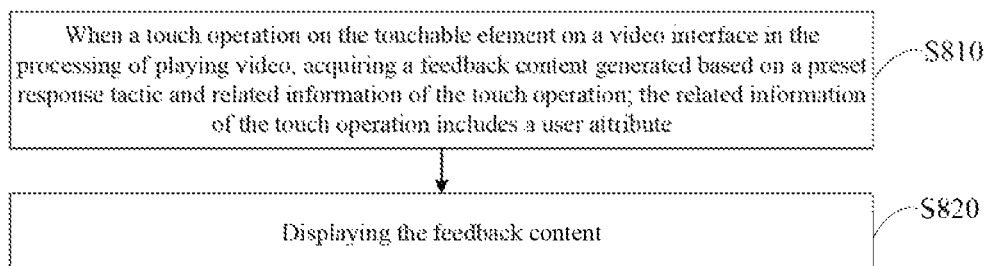
FIG. 8 is a flowchart of a method for displaying information on video provided by an eighth embodiment of the disclosure.

FIG. 8 shows a flowchart of a method of displaying information on video provided by an eighth embodiment of the disclosure, and this embodiment is applicable to the information displayed on a video interface. The method may be performed by an device for displaying information in a video, which may be implemented in software and/or hardware, integrated in a terminal having a function of playing video, such as a smart phone, a tablet computer, etc. Referring to FIG. 8, the method includes the following steps.

S810, upon detecting a touch operation on the touchable element on a video interface in the process of playing video, the feedback content generated according to a preset response tactic and related information of the touch operation is acquired; the related information of the touch operation includes user attributes.

In an embodiment, the step S810 may include the following steps S8*i*) and S8130.

S8110, a touchable element to be displayed in the process of playing video and configuration information of the touchable element sent from a server are acquired.

S8120, according to the configuration information of the touchable element, display time of the touchable element in the process of playing video and/or a display location of the touchable element on a video interface can be determined, and the touchable element is displayed according to the display time and/or the display position.

S8130, upon detecting a touch operation on the displayed touchable element, a feedback content corresponding to the touch operation is acquired; the feedback content is generated according to a preset response tactic and user attributes corresponding to the touch operation.

In an embodiment, the touchable element on the video interface is not limited to being sent from the server, and any touchable element displayed on the video interface is included in the protective scope of the embodiment; for example, the touchable element may also be a clickable control added to the video when the video is produced. Displaying the touchable element sent from the server can be referred to related description in the first embodiment above.

In an embodiment, the user attributes may be acquired as follows: user attributes, such as the name, age, etc. of a user, are acquired from user registration information stored in a server or a client; or data of user attributes can be generated based on a statistic result of behavior of a user on Internet from the server, such as user portrait data.

In an embodiment, the user attributes may include: at least one of the user identifier, name, age, gender, geographic location, education level, marital status, children, business, occupation, content bias (e.g., sports, entertainment, etc.), online shopping interests (e.g., apparel, maternal and infant supplies, etc.), environmental attributes (e.g., time, weather, etc.), consumption ability, and device attributes of the used device.

It should be noted that the content of the user attributes is not limited to the above examples, and any information related to the user that describes the user attributes is within the scope of the application.

As an embodiment, a feedback content corresponding to the touch operation is acquired, which may be implemented as follows: user attributes corresponding to the touch operation are reported to a server; and a feedback content sent from the server is received; the feedback content is determined by the server according to the preset response tactic and the received user attributes corresponding to the touch operation. In an embodiment, when the server determines the feedback content according to the preset response tactic and the received user attributes corresponding to the touch operation, the feedback content may also be determined by combining the ID of the touchable element corresponding to the touch operation and information such as the time of playing video.

In an embodiment, when preset conditions are satisfied, a feedback content sent from the server may be received, and the feedback content may be displayed.

In an embodiment, when preset conditions are satisfied, a feedback content sent from the server can be received and displayed, which at least can include three solutions as follows.

First, upon reaching a set point in time during a progress of playing video, a feedback content sent from the server is received and displayed; or a feedback content sent from the server is received in advance, and the feedback content is displayed upon reaching a set point in time during a progress of playing video. For example, at initial time of playing video, all feedback contents of the touchable element that may be possibly delivered are received, and then the corresponding feedback content will be displayed when the touchable element is triggered by a user. As another example, the feedback content can be sent out when the touchable element is triggered by a user, but the feedback content will be displayed after preset time or after a preset control is triggered.

Second, upon detecting a touch operation on a preset control, a response request is sent to the server, and a feedback content sent from the server according to the response request is received and displayed; and the preset control may be displayed throughout the entire process of playing video, or displayed when preset conditions are satisfied.

Upon detecting a touch operation on the touchable element, an association between the touchable element and the preset control may be displayed. For example, the association may be displayed with an animation effect (e.g. an animation effect that an arrow or a flash of lightning moves from the touchable element to the preset control at a certain speed) so as to prompt the user that the touch operation has been collected.

Third, upon reaching a set point in time during a progress of playing video, information sent from the server for displaying an interactive bar element is received, and the interactive bar element is displayed according to the information, or information previously sent from the server for displaying the interactive bar element at a set point in time during a progress of playing video is received; if a touch operation on the interactive bar element by the user is detected within a set time period, a response request will be sent to the server, and a feedback content sent from the server according to the response request is received and displayed; and if no touch operation on the interactive bar element by the user is detected within the set time period, the display of the interactive bar element is canceled. In an embodiment, the interactive bar element may be a touchable element, such as an image, a control, an animated image, etc.

As another embodiment, a feedback content corresponding to the touch operation is acquired, which may be implemented as follows: the feedback content is determined according to user attributes corresponding to the touch operation and a preset response tactic sent from the server. In an embodiment, when the client determines the feedback content according to the preset response tactic and the user attributes corresponding to the touch operation, the feedback content may also be determined by combining the ID of the touchable element corresponding to the touch operation, the time of playing video and other information.

In an embodiment, when the user attributes include a geographical location, the feedback content can include: information of other users watching the video within a preset range of geographic location and/or information of points of interest (POD within a preset range of geographic location.

Exemplarily, upon detecting the touch operation on the displayed touchable element, the geographic location of the current user may be acquired via a locating device in a terminal apparatus installing the client playing video, and the geographic location is reported to the server as a user attribute; and the server, after receiving the geographic location of the current user, may generate a feedback content according to the received geographic location of the current user; for example, it can determine other users watching the video within a preset range of geographic location of the current user, and generate a feedback content according to the information of other users to be sent to the client playing video, so that the current user can be aware of other users nearby who are currently watching the video, and follow the interested accounts of other users or adding other interested users as friends based on the feedback content. For example, in the case of adding other interested users as friends, the client playing video may send a request of adding friend to the server; the request of adding friend may carry basic information of the current user, such as the nickname, age, gender, location and common friends; after receiving the request of adding friend, the server sends basic information of the current user to a client playing video used by other interested users so as to inquire other interested users whether to add the current user as a friend or not; if it is detected that other interested users add the current user as a friend, the server may send the successfully added information as a feedback content to the client playing video used by the current user so as to prompt the current user that a friend is successfully added.

After receiving the geographic location of the current user, the server may also determine the POI information near the geographic location according to the received geographic location of the current user, and generate a feedback content according to the POI information and then send the feedback content to the client playing video, so that the current user can be aware of nearby POIs, and the POIs may include shops, gas stations, hotels, restaurants, tourist spots, bus stations, etc. For example, when a chain restaurant appears on the video, and after the client detects that the user clicks a certain touchable element displayed on the picture, the geographic location of the user and the ID of the touchable element can be sent to a server; and when it is determined that the content of the played video corresponding to the ID of the touchable element includes a chain restaurant, the server will search the same chain restaurants near the geographic location according to the geographic location of the current user, and generate a feedback content according to the search result to be sent to the client so as to notify the user information such as addresses, telephones and the like of the same chain restaurant nearby.

In an embodiment, when the user attributes include content bias and the content bias is a favorite category of video, tourist spot, or article, the feedback content can includes: video information of the video, tourist spot information of the tourist spot, or article information of the article. Exemplarily, the category of video preferred by the user may be determined according to the records of videos the user watched, and the category of video can be sent to the server as a user attribute; and upon detecting a touch operation on the displayed touchable element, the server may determine the feedback content based on the video category preferred by the user; for example, the feedback information can be ordered by arranging the category of video the user most interested in at the top of the feedback page to generate the feedback content. For example, in a searching scenario, when a search icon displayed next to a celebrity on a film video is clicked, a movie category preferred by the user, such as comedy movies, action movies, horror movies, etc., may be determined according to records of the user watching video, and the server acquires all the movies that the celebrity participated in, and orders the movies based on the movie categories preferred by the user so as to display the movie category preferred by the user first in the feedback content. As another example, the tourist spot type or the article type preferred by the user may be determined according to browsing history of the user and/or basic information of the user, and upon detecting a click by the user on a touchable element for information recommendation, the client sends the tourist spot type or the article type preferred by the user as a user attribute to the server; and based on the tourist spot type preferred by the user, the server may search tourist spots of this type and order the search results based on the distance from the location of the user, or based on the article type preferred by the user, the server may search the articles of this type, and generate a feedback content according to the search results. As another example, upon detecting a click by the user on a touchable element for information recommendation, the client sends the ID of the current user as a user attribute to the server; and the server searches portrait data of the current user according to the ID of the current user, and determines the tourist spot type or the article type preferred by the user according to the portrait data, and based on the tourist spot type preferred by the user, the server may search tourist spots of this type and order the search results based on the distance from the location of the user, or based on the article type preferred by the user, the server may search the articles of this type, and generate a feedback content according to the search results, thereby displaying the search results interested by the user and improving user experience.

S820, the feedback content is displayed.

In an embodiment, the feedback content may be displayed on a browser page, on a local page, or on a video interface. In an embodiment, displaying the feedback content on a browser page can be referred to related description in the first embodiment above.

Exemplarily, after detecting the touch operation on the touchable element, the method further includes: collecting related information of the touch operation; correspondingly, a feedback content generated based on a preset response tactic and the related information of the touch operation is acquired, and the feedback content is displayed, which can include: when preset conditions are satisfied, acquiring a feedback content determined based on the preset response tactic and the collected related information of the touch operation; and the feedback content is displayed; or, a feedback content generated based on the preset response tactic and the collected related information of the touch operation is acquired; and when preset conditions are satisfied, the feedback content is displayed.

In this embodiment, related information of the touch operation is collected, which may be implemented as follows: related information of the touch operation is reported to the server such that a feedback content is determined by the server based on a preset response tactic and the related information of the touch operation; or related information of the touch operation is cached such that a feedback content is determined by the client playing video based on a preset response tactic and the related information of the touch operation.

If the related information of the touch operation is collected by reporting the related information of the touch operation to a server, as an embodiment, when preset conditions are satisfied, a feedback content determined based on the preset response tactic and the collected related information of the touch operation is acquired, which may be implemented as follows: when preset conditions are satisfied, a feedback content sent from the server can be received; the feedback content is generated by the server based on the preset response tactic and the received related information of the touch operation.

Receiving the feedback content and displaying the feedback content can be referred to related description in the first embodiment above.

In an embodiment, when preset conditions are satisfied, a feedback content sent from the server can be received, which at least can include three solutions as follows.

First, upon reaching a set point in time during a progress of playing video, a feedback content sent from the server is received. Receiving the feedback content can be referred to related description in the first embodiment above.

Second, upon detecting a touch operation on a preset control, a response request is sent to the server, and a feedback content sent from the server according to the response request is received. The preset control may be displayed throughout the entire process of playing video, or displayed when preset conditions are satisfied; for example, the preset control can be displayed when a preset point in time is reached, and the preset point in time may be a point in time at which the first touchable element is displayed, or another point in time.

In an embodiment, upon detecting a touch operation on the touchable element, an association between the touchable element and the preset control may be displayed. For example, the association may be displayed with an animation effect (e.g. an animation effect that an arrow or a flash of lightning moves from the touchable element to the preset control at a certain speed) so as to prompt the user that the touch operation has been collected, and inform the user that a corresponding feedback content can be obtained by performing the touch operation on the preset control.

Third, upon reaching a set point in time during a progress of playing video, an interactive bar element is displayed based on information for displaying the interactive bar element sent from the server; and upon detecting a touch operation by a user on the interactive bar element, a response request is sent to the server, and a feedback content sent from the server according to the response request is received. Alternatively, upon reaching a set point in time during a progress of playing video, the interactive bar element is displayed according to information sent from the server for displaying an interactive bar element, or information previously sent from the server for displaying the interactive bar element at a set point in time during a progress of playing video is received; and if a touch operation on the interactive bar element by the user is detected within a set time period, a response request is sent to the server, and a feedback content sent from the server according to the response request is received and displayed (i.e., the feedback content is displayed on a browser page). Of course, the feedback content can further be determined based on a response tactic sent from the server in advance, and the feedback content is displayed; and if no touch operation on the interactive bar element by the user is detected within the set time period, the display of the interactive bar element is canceled. In an embodiment, the interactive bar element may be a touchable element in this embodiment, such as an image, a control, an animated image, etc.

In an embodiment, the response request may include a detected duration of the touch operation on the preset control, so that the server can generate a feedback content according to the duration of the touch operation on the preset control, thereby achieving the effect of displaying the feedback content with different effects according to different durations of the touch operation on the preset control by the user.

As another embodiment, a feedback content determined based on the preset response tactic and the collected related information of the touch operation is acquired, and when preset conditions are satisfied, the feedback content can be displayed, which can include three solutions as follows.

First, the feedback content generated according to the preset response tactic and the received related information of the touch operation sent from the server is acquired, and the feedback content is displayed upon reaching a set point in time during a progress of playing video. Displaying the feedback content can be referred to related description in the first embodiment above.

Second, the feedback content generated according to the preset response tactic and the received related information of the touch operation sent from the server is acquired, and the feedback content is displayed upon detecting a touch operation on a preset control. The preset control may be displayed throughout the entire process of playing video, or displayed when preset conditions are satisfied; for example, the preset control is displayed when a preset point in time is reached, and the preset point in time may be a point in time at which the last touchable element is displayed, or another point in time. Upon detecting a touch operation on the touchable element, an association between the touchable element and the preset control may also be displayed.

Third, a feedback content generated according to the preset response tactic and the received related information of the touch operation sent from the server is acquired; upon reaching a set point in time during a progress of playing video, an interactive bar element is displayed based on information for displaying the interactive bar element sent from the server; and upon detecting a touch operation on the interactive bar element, the feedback content is displayed. In an embodiment, the information of the interactive bar element may be sent from the server in advance, or sent from the server upon reaching a set point in time during a progress of playing video.

If the related information of the touch operation is collected by caching the related information of the touch operation, as an embodiment, when preset conditions are satisfied, a feedback content determined based on the preset response tactic and the collected related information of the touch operation is acquired, which may be implemented as follows; when preset conditions are satisfied, a feedback content is determined according to the cached related information of the touch operation and a response tactic sent from the server. Exemplarily, the preset response tactic may be sent from the server to the client prior to displaying the touchable element, which can be delivered to the client prior to or in the process of playing video, or delivered to the client together with configuration information of the touchable element.

In an embodiment, when preset conditions are satisfied, the feedback content is determined according to the cached related information of the touch operation and a response tactic sent from the server, which at least can include two solutions as follows.

First, upon reaching a set point in time during a progress of playing video, the feedback content is determined according to the cached related information of the touch operation and a response tactic sent from the server.

Second, upon detecting a touch operation on a preset control, the feedback content is determined according to the cached related information of the touch operation and a response tactic sent from the server. This mode may be as follows: upon detecting a touch operation on a preset control, a feedback content is determined according to the duration of the touch operation on the preset control, the cached related information of the touch operation and a response tactic sent from the server, thereby achieving the effect of displaying the feedback content with different effects according to different durations of the touch operation on the preset control by the user.

As another embodiment, a feedback content determined based on the preset response tactic and the collected related information of the touch operation is acquired, and when preset conditions are satisfied, the feedback content is displayed, which can include two solutions as follows.

First, the feedback content is determined according to the cached related information of the touch operation and a response tactic sent from the server, and upon reaching a set point in time during a progress of playing video, the feedback content is displayed.

Second, the feedback content is determined according to the cached related information of the touch operation and a response tactic sent from the server, and upon detecting a touch operation on a preset control, the feedback content is displayed.

In an embodiment, the related information of the touch operation further includes: an identifier of a touchable element corresponding to the touch operation and/or time of playing video when the touch operation occurs, and attributes of a current user, thereby allowing that different touchable elements may correspond to different feedback contents, and one touchable element with various time of playing video and user attributes may correspond to different feedback contents. The identifier of a touchable element may include the name, serial number, display location, etc. of a touchable element.

Exemplarily, after related information of the touch operation is reported to a server, the method further includes: receiving a touchable element and configuration information of the touchable element subsequently sent from the server, the touchable element and/or the configuration information of the touchable element subsequently delivered are determined according to user attributes; according to the configuration information of the touchable element, display time of the touchable element in the process of playing video and a display location of the touchable element on the video interface are determined, and the touchable element is displayed according to the display time and the display location. That is, in addition to determining the feedback content according to the user attributes, the server may also determine a subsequently delivered touchable element and/or configuration information of the touchable element according to the user attributes, and displaying the subsequently delivered touchable element can be referred to related description in the first embodiment above.

When the feedback content is displayed, the process of playing video will not be interrupted; or, when the displayed feedback content includes content in a preset category, the video will be controlled to be paused to play, and when the displayed feedback content does not include content in a preset category, it is determined not to pause the video.

It should be noted that whether to pause to play video or not is controllable, e.g. by the server or by the client, and the specific control scheme of whether to pause to play video or not can be referred to related description the first embodiment descried above.

In this embodiment, when the feedback content is determined according to the user attributes and the preset response tactic, one touchable element with different user attributes may correspond to different feedback contents; for example, the feedback contents may differ in content, display mode and/or display time. In an embodiment, the display mode includes the location, display effects (e.g., color, shape, style, size), etc. The display timing includes displaying immediately or after a certain period of time, etc. For example, in the case that the feedback contents differ in content, if the age in user attributes is smaller than a certain age value, the feedback content may be playing a musical for children, and if the age in user attributes is higher than a certain age value, the feedback content may be playing a song suitable for adults. For example, in the case that the feedback contents differ in display mode, if the age in user attributes is smaller than a certain age value, the respond mode may be displaying the content of an article with smaller characters, and if the age in user attributes is higher than a certain age value, the respond mode may be displaying the content of an article with larger characters. For example, in the case that the feedback contents differ in display time, if it is determined that the current user is a vip user according to the user attributes, the feedback content is immediately displayed after acquisition, and if it is determined that the current user is not a vip user according to the user attributes, the feedback content is displayed a certain period of time later from acquisition. In addition to determining the feedback content according to the user attributes, the server may also determine a subsequently delivered touchable element and/or configuration information of the touchable element according to the user attributes, and correspondingly the client receives the touchable element and/or the configuration information of the touchable element determined according to the user attributes subsequently sent from the server, and then returns to S820. Therefore, a series of touchable elements delivered in the process of playing video correspond to a series of interactive activities which can be different according to different user attributes. As an embodiment, in a test scenario, a server may determine a touchable element to be delivered subsequently according to user attributes such as the age and education level of a user; for example, if the user has a low education level, the questions in the test may be set in forms of choice questions or true-or-false questions, so that the degree of difficulty of the test is reduced, and the user can better participate; and if the user has a high education level, the questions in the test may be set as completions, so that the degree of difficulty of the test is increased, and the test becomes more challenging for the user.

It should be noted that the implementation of generating a feedback content based on user attributes is not limited to the examples described above, and any method of generating a feedback content based on user attributes is within the protective scope of the embodiment.

According to the technical scheme of this embodiment, upon detecting a touch operation on a touchable element on the video interface, the touch operation is responded according to a preset response tactic and user attributes to generate a corresponding feedback content, so that different users are provided with different responses; the purpose of personalized response according to user attributes is achieved, and the user experience is improved.

Ninth Embodiment

Figure 9:
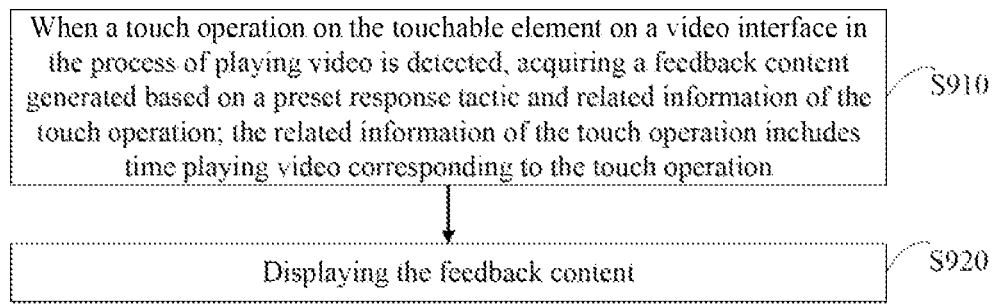
FIG. 9 is a flowchart of a method for displaying information on video provided by a ninth embodiment of the disclosure.

FIG. 9 shows a flowchart of a method of displaying information on video provided by a ninth embodiment of the disclosure, and this embodiment is applicable to the information displayed on a video interface. The method may be performed by an device for displaying information on video, which may be implemented in software and/or hardware, integrated in a terminal having a function of playing video, such as a smart phone, a tablet computer, etc. Referring to FIG. 9, the method includes the following steps.

S910, upon detecting a touch operation on the touchable element on a video interface in the process of playing video, a feedback content generated according to a preset response tactic and related information of the touch operation is acquired; the related information of the touch operation includes time of playing video corresponding to the touch operation.

In an embodiment, the step S910 may include the following steps S9110-S9130.

S9110, a touchable element to be displayed in the process of playing video and configuration information of the touchable element sent from a server are acquired.

S9120, according to the configuration information of the touchable element, display time of the touchable element in the process of playing video and/or a display location of the touchable element on a video interface are determined, and the touchable element is displayed according to the display time and/or the display position.

S9130, upon detecting a touch operation on the displayed touchable element, a feedback content corresponding to the touch operation is acquired; the feedback content is generated according to a preset response tactic and time of playing video corresponding to the touch operation.

In an embodiment, the touchable element on the video interface is not limited to being sent from the server, and any touchable element displayed on the video interface is within the protective scope of the embodiment; for example, the touchable element may also be a clickable control added to the video in the production of the video. When the touchable element on the video interface is sent from the server, displaying the touchable element can be referred to the related description in the first embodiment above.

In an embodiment, the time of playing video may be any information that can serve as a time pin, such as a timestamp, a fame number, etc. In an embodiment, the method for determining time of playing video corresponding to the touch operation on the touchable element may be as follows: display time corresponding to the touchable element is determined (i.e., the display time corresponding to the touchable element may be determined from the configuration information of the touchable element sent from the server), and used as the time of playing video corresponding to the touch operation, and a point in time during a progress of playing video when the touch operation is detected may also be determined as the time of playing video corresponding to the touch operation. The time of playing video corresponding to the touch operation may be reported to the server immediately upon detecting the touch operation on the touchable element, or reported when preset conditions are satisfied, such as upon reaching a set point in time during a progress of playing video or upon detecting a touch operation on a preset control, and the time of playing video corresponding to the touch operation is reported to the server.

As an embodiment, a feedback content corresponding to the touch operation is acquired, which may be implemented as follows: time of playing video corresponding to the touch operation is reported to a server, and a feedback content sent from the server is received; the feedback content is determined by the server according to the preset response tactic and the received time of playing video corresponding to the touch operation. Of course, when the server determines the feedback content according to the preset response tactic and the received time of playing video corresponding to the touch operation, the feedback content may also be determined by combining the ID of the touchable element corresponding to the touch operation, the user attributes and other information.

In an embodiment, when preset conditions are satisfied, a feedback content sent from the server may be received, and the feedback content may be displayed.

In an embodiment, when preset conditions are satisfied, a feedback content sent from the server is received and displayed, which at least can include three solutions as follows.

First, upon reaching a set point in time during a progress of playing video, a feedback content sent from the server is received and displayed; or a feedback content sent from the server is received in advance, and the feedback content is displayed upon reaching a set point in time during a progress of playing video. For example, at initial time of playing video, all feedback contents of the touchable element that may be possibly delivered for are received, and then the corresponding feedback content can be displayed when the touchable element is triggered by a user. As another example, the feedback content can be delivered when the touchable element is triggered by a user, but the feedback content is displayed after a preset period of time or a preset control is triggered.

Second, upon detecting a touch operation on a preset control, a response request is sent to the server, and a feedback content sent from the server according to the response request is received and displayed; and the preset control may be displayed throughout the entire process of playing video, or displayed when preset conditions are satisfied.

In an embodiment, upon detecting a touch operation on the touchable element, an association between the touchable element and the preset control may be displayed. For example, the association may be displayed with an animation effect (e.g. an animation effect that an arrow or a flash of lightning moves from the touchable element to the preset control at a certain speed) so as to prompt the user that the touch operation has been collected.

Third, upon reaching a set point in time during a progress of playing video, information sent from the server for displaying an interactive bar element is received, and the interactive bar element is displayed according to the information, or information previously sent from the server for displaying the interactive bar element at a set point in time during a progress of playing video is received; if a touch operation on the interactive bar element by the user is detected within a set time period, a response request will be sent to the server, and a feedback content sent from the server according to the response request is received, and the feedback content is displayed; if no touch operation on the interactive bar element by the user is detected within the set time period, the display of the interactive bar element is canceled. In an embodiment, the interactive bar element may be a touchable element, such as an image, a control, an animated image, etc.

As another embodiment, a feedback content corresponding to the touch operation is acquired, which may be implemented as follows: the feedback content is determined according to the time of playing video corresponding to the touch operation and a preset response tactic sent from the server. Of course, when the client determines the feedback content according to the preset response tactic and the time of playing video corresponding to the touch operation, the feedback content may also be determined by combining the ID of the touchable element corresponding to the touch operation, the user attributes and other information.

In this embodiment, when the feedback content is determined according to the time of playing video and the preset response tactic, one touchable element with different time of playing video may correspond to different feedback contents; for example, the feedback contents may differ in contents, display modes and/or display time. In an embodiment, the display mode includes the location, display effects (e.g., color, shape, style, size), etc. The display time includes to display immediately or after a certain period of time, etc. In the case that the feedback contents differ in content, in a testing scenario, it is assumed that an answer option as a touchable element is displayed for 4 seconds, if the time of playing video at the detection of the touch operation on the touchable element is within the first two seconds of the duration of the display of the answer option, then the feedback content may include that the answer is rapidly selected, which is top 10% of all participants, and if the time of playing video at the detection of the touch operation on the touchable element is within the last two seconds of the duration of the display of the answer option, then the feedback content may include that the answer is slowly selected, which is the last 30% of all participants. In the case that the feedback contents differ in display mode, if the time of playing video at the detection of the touch operation on the touchable element is within the first two seconds of the duration of the display of the answer option, then the feedback content may include that the answer is rapidly selected, which is top 10% of all participants, and the characters can be displayed in warm colors, and if the time of playing video at the detection of the touch operation on the touchable element is within the last two seconds of the duration of the display of the answer option, then the feedback content may include that the answer is slowly selected, which is the last 30% of all participants, and the characters can be displayed in cold colors. In the case that the feedback contents differ in display time, if it is detected that the time of playing video at detection of the touch operation on the touchable element is close to the time to publish the answer, then whether the user has answered the question correctly or not will be displayed immediately, and if it is detected that the time of playing video at detection of the touch operation on the touchable element is far from the time to publish the answer, then whether the user has answered the question correctly or not will be displayed a certain period of time later.

In an embodiment, the feedback content is determined by acquiring, by the server, a video frame corresponding to the time of playing video, after determining a content of the played video corresponding to the time of playing video based on the video frame, and determining the feedback content according to the content of the played video.

In this embodiment, the server determines the feedback content according to a preset response tactic and time of playing video corresponding to the touch operation, which may be implemented as follows: a content of the played video corresponding to the time of playing video is determined, and the feedback content is determined according to the content of the played video. In an embodiment, a content of the played video corresponding to the time of playing video is determined, which may be implemented as follows: a video frame in the video corresponding to the time of playing video is acquired, and a content of the played video corresponding to the time of playing video is determined based on the video frame. For example, the content of the played video in the video frame may be recognized by using an image recognition algorithm, and the content of the played video in the video frame also may be recognized by using a pre-trained neural network model for recognizing image contents. For example, in a scenario to follow a microblog, an image with "follow this microblog" is displayed at a certain position at a certain point in time in the process of playing video, and the display duration of the image may be a long time, such as 10 seconds; after a click by a user on the image with "follow this microblog" is detected at a playing point in time of a, the identifier of the image and the playing point in time of a can be sent to a server; the server, according to the received identifier of the image and the playing point in time of a, determines that a guest A in the show is displayed beside the image at the playing point in time of a, then a microblog homepage of the guest A is acquired, and a file such as an HTML, XHTML, HTML5, CSS or javascript file is generated based on the microblog homepage, and the HTML, XHTML, HTML5, CSS, or javascript file is delivered to the client, and the client displays a feedback content carried in the HTML, XHTML, HTML5, CSS, or javascript file, i.e. the microblog homepage of the guest A in a browser which has been started.

S920, the feedback content is displayed.

In an embodiment, the feedback content may be displayed on a browser page, on a local page, or on a video interface. In an embodiment, displaying the feedback content on a browser page can be referred to related description in the first embodiment above.

In an embodiment, one touchable element may be delivered for multiple times in the process of playing the same video or different videos, and by collecting the time when the touchable element is actually touched by the user, the feedback content may be displayed based on the time, and it also can analyze based on time and/or times of multiple touchable elements being touched (i.e., time and/or times triggered by the same user, or time and/or times triggered by some or all users), so that the service tactic is executed based on the analysis result; for example, the delivery time of the touchable element and/or delivery objects (i.e., users receiving the touchable element) can be optimized based on the analysis result, etc.

Exemplarily, after detecting the touch operation on the touchable element, the method further includes: collecting related information of the touch operation; correspondingly, a feedback content generated based on a preset response tactic and the related information of the touch operation can be acquired, and the feedback content is displayed, which can include: when preset conditions are satisfied, acquiring a feedback content determined based on the preset response tactic and the collected related information of the touch operation; and the feedback content is displayed; or, a feedback content generated based on the preset response tactic and the collected related information of the touch operation is acquired; and when preset conditions are satisfied, the feedback content is displayed.

In this embodiment, related information of the touch operation is collected, which may be implemented as follows: related information of the touch operation is reported to the server such that a feedback content is determined by the server based on a preset response tactic and the related information of the touch operation; and it may also be: caching related information of the touch operation such that a feedback content is determined by the client playing video based on a preset response tactic and the related information of the touch operation.

If the related information of the touch operation is collected by reporting the related information of the touch operation to a server, as an embodiment, when preset conditions are satisfied, a feedback content determined based on the preset response tactic and the collected related information of the touch operation is acquired, and the feedback content is displayed, which may be implemented as follows: when preset conditions are satisfied, a feedback content sent from the server is received, and the feedback content is displayed, the feedback content is generated by the server based on the preset response tactic and the received related information of the touch operation.

Receiving the feedback content and displaying the feedback content can be referred to related description in the first embodiment above.

In an embodiment, when preset conditions are satisfied, a feedback content sent from the server is received, which at least can include three solutions as follows.

First, upon reaching a set point in time during a progress of playing video, a feedback content sent from the server is received. Receiving the feedback content can be referred to related description in the first embodiment above.

Second, upon detecting a touch operation on a preset control, a response request is sent to the server, and a feedback content sent from the server according to the response request is received. The preset control may be displayed throughout the entire process of playing video, and also may be displayed when preset conditions are satisfied; for example, the preset control is displayed when a preset point in time is reached, and the preset point in time may be a point in time at which the first touchable element is displayed, or another point in time.

In an embodiment, upon detecting a touch operation on the touchable element, an association between the touchable element and the preset control may be displayed. For example, the association may be displayed with an animation effect (e.g. an animation effect that an arrow or a flash of lightning moves from the touchable element to the preset control at a certain speed) so as to prompt the user that the touch operation has been collected, and remind the user that a corresponding feedback content can be obtained by performing the touch operation on the preset control.

Third, upon reaching a set point in time during a progress of playing video, an interactive bar element is displayed based on information for displaying the interactive bar element sent from the server; and upon detecting a touch operation by a user on the interactive bar element, a response request is sent to the server, and a feedback content sent from the server according to the response request is received. Alternatively, upon reaching a set point in time during a progress of playing video, the interactive bar element is displayed according to information sent from the server for displaying an interactive bar element, or information previously sent from the server for displaying the interactive bar element at a set point in time during a progress of playing video is received; if a touch operation on the interactive bar element by a user is detected within a set time period, a response request will be sent to a server, a feedback content sent from the server according to the response request is received, and the feedback content is displayed (i.e., the feedback content is displayed on a browser page); of course, it may also be implemented as a feedback content is determined based on a response tactic sent from the server in advance, and the feedback content is displayed; and if no touch operation on the interactive bar element by the user is detected within the set time period, the display of the interactive bar element is canceled. In an embodiment, the interactive bar element may be a touchable element in this embodiment, such as an image, a control, an animated image, etc.

In an embodiment, the response request may include a detected duration of the touch operation on the preset control, so that the server generates a feedback content according to the duration of the touch operation of the preset control, thereby achieving the effect of displaying different feedback contents according to different durations of the touch operation on the preset control by the user.

As another embodiment, a feedback content determined based on the preset response tactic and the collected related information of the touch operation is acquired, and when preset conditions are satisfied, the feedback content is displayed, which may include three solutions as follows.

First, the feedback content generated according to the preset response tactic and the received related information of the touch operation sent from the server is acquired, and the feedback content is displayed upon reaching a set point in time during a progress of playing video. Displaying the feedback content can be referred to related description in the first embodiment above.

Second, the feedback content generated according to the preset response tactic and the received related information of the touch operation sent from the server is acquired, and the feedback content is displayed upon detecting a touch operation on a preset control. The preset control may be displayed throughout the entire process of playing video, or displayed when preset conditions are satisfied; for example, the preset control is displayed when a preset point in time is reached, and the preset point in time may be a point in time at which the last touchable element is displayed, or another point in time. Upon detecting a touch operation on the touchable element, an association between the touchable element and the preset control may also be displayed.

Third, a feedback content generated according to the preset response tactic and the received related information of the touch operation sent from the server is acquired; upon reaching a set point in time during a progress of playing video, an interactive bar element is displayed based on information for displaying the interactive bar element sent from the server; and upon detecting a touch operation on the interactive bar element, the feedback content is displayed. In an embodiment, the information of the interactive bar element may be sent from the server in advance, or sent from the server upon reaching a set point in time during a progress of playing video.

If the related information of the touch operation is collected by caching the related information of the touch operation, as an embodiment, when preset conditions are satisfied, a feedback content determined based on the preset response tactic and the collected related information of the touch operation is acquired, which may be implemented as follows: when preset conditions are satisfied, a feedback content is determined according to the cached related information of the touch operation and a response tactic sent from the server. Exemplarily, the preset response tactic may be sent from the server to the client prior to displaying the touchable element, which can be delivered to the client prior to or in the process of playing video, or delivered to the client together with configuration information of the touchable element.

In an embodiment, when preset conditions are satisfied, the feedback content is determined according to the cached related information of the touch operation and a response tactic sent from the server, which at least can include two solutions as follows.

First, upon reaching a set point in time during a progress of playing video, the feedback content is determined according to the cached related information of the touch operation and a response tactic sent from the server.

Second, upon detecting a touch operation on a preset control, the feedback content is determined according to the cached related information of the touch operation and a response tactic sent from the server. This mode may be as follows: upon detecting a touch operation on a preset control, a feedback content is determined according to the duration of the touch operation on the preset control, the cached related information of the touch operation and a response tactic sent from the server, thereby achieving the effect of displaying the feedback content with different effects according to different durations of the touch operation on the preset control by the user.

As another embodiment, a feedback content determined based on the preset response tactic and the collected related information of the touch operation is acquired, and when preset conditions are satisfied, the feedback content is displayed, which can include two solutions as follows.

First, the feedback content is determined according to the cached related information of the touch operation and a response tactic sent from the server, and upon reaching a set point in time during a progress of playing video, the feedback content is displayed.

Second, the feedback content is determined according to the cached related information of the touch operation and a response tactic sent from the server, and upon detecting a touch operation on a preset control, the feedback content is displayed.

When the feedback content is displayed, the process of playing video will not be interrupted; or, when the displayed feedback content includes content in a preset category, the video will be controlled to be paused to play, and when the displayed feedback content does not include content in a preset category, it is determined not to pause the video.

It should be noted that whether to pause to play video or not is controllable, e.g. by the server or by the client, and the specific control scheme of whether to pause to play video or not can be referred to related description the first embodiment descried above.

According to the technical scheme of this embodiment, upon detecting a touch operation on a touchable element on the video interface, the touch operation is responded according to the preset response tactic and the time of playing video corresponding to the touch operation, and a corresponding feedback content is generated, so that different responses are provided aiming at different time of playing video; the flexibility of content displaying is improved to a great extent, and the interactivity with the user in the process of playing video is enhanced by associating the response content with the content of the played video, thereby improving the user experience.

Tenth Embodiment

Figure 10:
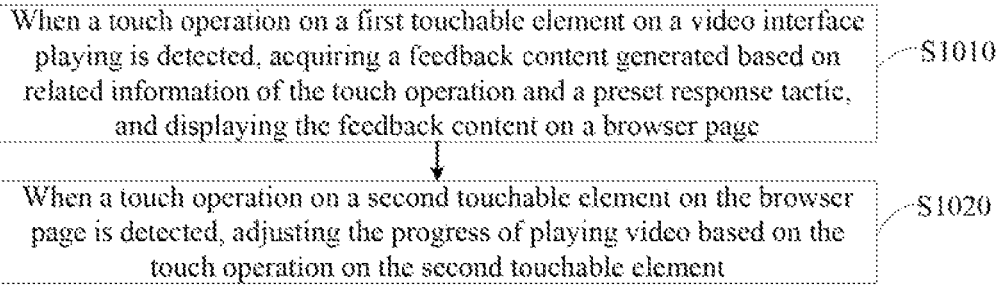
FIG. 10 is a flowchart of a video playing control method provided by a tenth embodiment of the disclosure.

FIG. 10 shows a flowchart of a video playing control method provided by a tenth embodiment of the disclosure, and this embodiment can be applied for controlling the progress of playing video. The method may be performed by a video playing control device, which may be implemented in software and/or hardware, integrated in a terminal having a function of playing video, such as a smart phone, a tablet computer, etc. Referring to FIG. 10, the method includes the following steps.

S1010, upon detecting a touch operation on a first touchable element on a video interface in the process of playing video, a feedback content generated based on related information of the touch operation and a preset response tactic is acquired, and the feedback content is displayed on a browser page.

That is, upon detecting a touch operation on a first touchable element on a video interface, a feedback content corresponding to the touch operation is acquired, and the feedback content is displayed on a browser page; the feedback content is generated according to a preset response tactic and related information of the touch operation. Among others, the feedback content may also be displayed on a local page or a video interface.

In an embodiment, the first touchable element is similar in concept to the touchable element in the embodiments described above, and reference can be made to the related description in the first embodiment above. Acquiring a feedback content generated based on related information of the touch operation and a preset response tactic, and displaying the feedback content on a browser page can be referred to related description in the first embodiment above.

In an embodiment, the first touchable element may be displayed on the video interface in the following ways: a touchable element to be displayed in the process of playing video and configuration information of the touchable element sent from a server are acquired; and according to the configuration information of the touchable element, display time of the touchable element in the process of playing video and/or a display location of the touchable element on the video interface can be determined, and the touchable element is displayed according to the display time and/or the display location.

In an embodiment, the touchable element on the video interface is not limited to being sent from the server, and any touchable element displayed on the video interface is within the protective scope of the embodiment; for example, the touchable element may also be a clickable control added to the video in the production of the video. When the touchable element on the video interface is sent from the server, displaying the touchable element can be referred to the related description in the first embodiment above.

S1020, upon detecting a touch operation on a second touchable element on the browser page, the progress of playing video is adjusted according to the touch operation on the second touchable element.

In an embodiment, the feedback content may include a second touchable element; for example, one or more second touchable elements may be displayed on the browser page, and different second touchable elements may correspond to different or same video progress adjusting method(s) or target point in time(s) to adjust the progress of playing video.

As described above, the progress of playing video may be adjusted according to the touch operation on the second touchable element, which may be implemented in the following way: a target point in time for adjusting the progress of playing video corresponding to the second touchable element is determined, and the progress of playing video is adjusted to the target point in time. For example, a target point in time for adjusting the progress of playing video corresponding to the second touchable element is determined; the target point in time is sent to an application playing the video via a browser, and the progress of playing video is adjusted to the target point in time by the application playing the video.

In an embodiment, a target point in time for adjusting the progress of playing video corresponding to the second touchable element is determined, which may be implemented as follows: a target point in time for adjusting the progress of playing video corresponding to the second touchable element is determined according to information sent from a server in advance. That is, a target point in time for adjusting the progress of playing video corresponding to the second touchable element is determined according the information sent from the server; the target point in time is sent to an application playing the video via a browser, and the progress of playing video is adjusted to the target point in time by the application. In an embodiment, the information sent from the server may be a response tactic corresponding to the second touchable element, and the response tactic may be sent from the server to the client in advance before the browser page is displayed; for example, the server, when the feedback content to be displayed on the browser page is sent to the client, may deliver the response tactic of the second touchable element displayed on the browser page.

For example, "highlights at 07:59" is displayed on a button in the browser page, and after a click operation on the button is detected, the progress of the video is adjusted to a playing point in time of 07:59 for playing.

As another example, in a testing scenario, upon detecting the user clicks the "to be answered" button displayed on a browser page, the progress of playing video may be controlled to get to a point in time where answer options of a question not answered appear, so that the user can answer the question by clicking a corresponding answer option at this point in time.

As described above, a target point in time for adjusting the progress of playing video corresponding to the second touchable element is determined according to information sent from a server in advance, which may also be implemented as follows.

A first touchable element associated with the second touchable element is determined according to an association relation between the second touchable element and the first touchable element delivered by the server in advance; configuration information of the first touchable element is acquired; start time to display the first touchable element is acquired according to the configuration information of the first touchable element, and the start time to display is determined as a target point in time for adjusting the progress of playing video corresponding to the second touchable element; the target point in time is sent to an application playing the video via a browser, and the progress of playing video is adjusted to the target point in time by the application. In an embodiment, a first touchable element associated with the second touchable element, on which a touch operation is detected, may be determined according to an association relation between the second touchable element and the first touchable element sent from the server, and the association relation may be delivered to the client by the server in advance before the browser page is displayed; for example, the server, when the feedback content to be displayed on the browser page is sent to the client, may deliver the association relation between the second touchable element and the first touchable element displayed on the browser page together.

Alternatively, a target point in time for adjusting the progress of playing video corresponding to the second touchable element sent from the server is acquired; the target point in time is sent to an application playing the video via a browser, and the progress of playing video is adjusted to the target point in time by the application; the target point in time may be delivered to the client by the server in advance before the browser page is displayed; for example, the server, when the feedback content to be displayed on the browser page is sent to the client, may deliver the target point in time corresponding to the second touchable element displayed on the browser page together.

Exemplarily, in a process of playing a teaching video (an exercise is provided after each teaching content), a first touchable element displaying contents of options to exercises for the current teaching content is displayed at the end of each teaching content, and upon detecting a click operation by the user on the first touchable element, related information of the click operation is cached; upon detecting the click operation by the user on a submission button, the cached related information of the click operation on the first touchable element is reported to the server; the server generates a feedback content according to the received related information of the click operation on the first touchable element and delivers the feedback content to the client; and the client displays the feedback content on a browser page; the feedback content may include whether the user answers correctly or not for each exercise of the current teaching content. Further, a skip button may also be displayed on the browser page as a second touchable element, and a user may click the skip button if he/she has correctly answered every exercise, and he/she has mastered the next teaching content in advance and wants to directly do the exercises after the next teaching content instead of continuously watching the next teaching content. Upon detecting the click operation on the skip button, the client determines start time corresponding to display contents of options of the exercises after the next teaching content, takes the start time to display as a target point in time for adjusting the progress of playing video, and sends the target point in time to the application playing the video, and the application may directly adjust the teaching video to the exercises after the next teaching content according to the target point in time, so that the user can directly do the exercises following the next teaching content without watching the next teaching content.

On the basis of the technical scheme described above, before the progress of playing video is adjusted according to the touch operation on the second touchable element, the method may further includes: displaying prompt information on the video interface so as to prompt the user whether the progress of playing video needs to be adjusted to the target point in time or not, and the progress of playing video is adjusted to the target point in time according to confirmation of the user, thereby preventing misoperation of the user.

After the progress of playing video is adjusted, the user may choose whether to close the current browser page or not. In an embodiment, whether to close the current browser page or not may be controlled either by the browser or by the server. If it is the server that controls whether to close the current browser page or not, it may be as follows: the server delivers a notification message indicating whether to close the browser page or not when the touch operation on the second touchable element on the browser page is detected, and the notification message may include flag information which is used for indicating whether to close the browser page or not when the touch operation on the second touchable element on the browser page is detected; or, the notification message may contain flag information for each second touchable element on the browser page, and each flag information is used for indicating whether to close the browser page or not when a corresponding second touchable element is detected. The browser, after receiving the notification message sent from the server, determines whether to close the browser page or not according to the notification message, if it is the browser that controls whether to close the browser page or not, the browser may determine whether to close the browser page or not based on the default flag information written in the code in advance.

In an embodiment, when the feedback content is displayed on a browser page, the browser page is displayed on the same screen with a video interface, and the browser page and the video interface partially overlap. When a browser page is displayed, the video playing will not be affected, namely keeping to play video without interruption.

In an embodiment, the feedback content is displayed on a browser page, which may be implemented as follows; a new process is created; a WebView control is created by the new process, and the feedback content is displayed through the WebView control; or, a WebView control is created by a process for playing the video, and the feedback content is displayed through the WebView control. This scheme can refer to the related description in the first embodiment above.

The process of playing video can be paused when the browser page is displayed, and the video will continue to be played when the browser page is closed. It should be noted that whether to pause to play video or not is controllable, e.g. by the server or by the client, and the control scheme to pause the video or not can be referred to related description in the first embodiment descried above.

According to the technical scheme of this embodiment, upon detecting a touch operation on the first touchable element, the preset feedback content is displayed as response to the touch operation. Compared with a local page, the content displayed in the browser can be freely updated and expanded according to actual needs, so that the interactivity with the user in the process of playing video is enhanced, and the flexibility and diversity of the display of the touchable element are improved; and upon detecting a touch operation on the second touchable element on the browser page, the progress of playing video is adjusted according to a preset response tactic so as to adjust the point in time of playing the video to a point in time matching the content displayed on the browser, so that the interactivity in the process of playing video is enhanced.

Eleventh Embodiment

Figure 11:
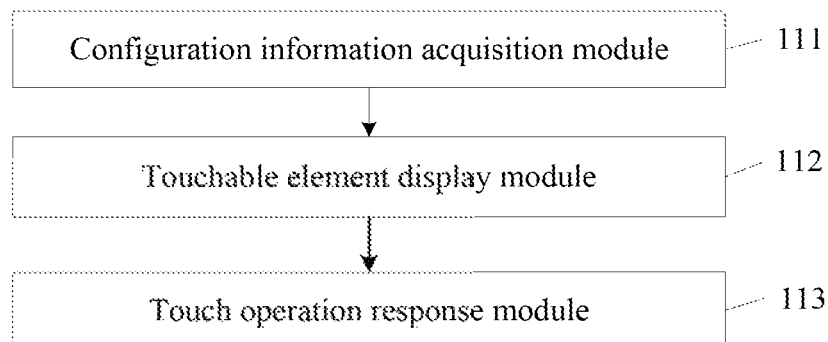
FIG. 11 is a structural schematic view of a device for displaying information on video provided by an eleventh embodiment of the disclosure.

FIG. 11 shows a structural schematic view of a device for displaying information on video provided by an eleventh embodiment of the disclosure, and this embodiment is applicable to the information displayed on a video interface. The device includes: a configuration information acquisition module 111, a touchable element display module 112, and a touch operation response module 113.

In this embodiment, the configuration information acquisition module 111 is configured for acquiring a touchable element to be displayed in the process of playing video and configuration information of the touchable element sent from a server; the touchable element display module 112 is configured for determining, according to the configuration information of the touchable element, a display time of the touchable element in the process of playing video and a display location of the touchable element on a video interface, and displaying the touchable element according to the display time and the display location; and the touch operation response module 113 is configured for, upon detecting a touch operation on the displayed touchable element, responding to the touch operation according to a preset response tactic.

In an embodiment, the configuration information acquisition module 111 is configured for: acquiring a touchable element to be displayed in the process of playing video and configuration information of the touchable element sent from a server before playing video; or receiving a touchable element to be displayed in the process of playing video and configuration information of the touchable element sent from a server in the process of playing video; or sending a delivery request to a server at a first set time in the process of playing video, and receiving a touchable element to be displayed at a second set time in the process of playing video and configuration information of the touchable element sent from the server; wherein the second set time is after the first set time.

In an embodiment, the touchable element comprises: an image, a control, a video, or an animated image.

In an embodiment, the configuration information of the touchable element includes: at least one of display start time, display duration, display location, and display effect information.

In an embodiment, the display effect information of the touchable element may be determined by the server according to statistical data about touch operations performed by one or more users on the touchable element.

In an embodiment, the touch operation includes a contact and/or non-contact interaction operation.

In an embodiment, the touchable element display module 112 is configured to display the touchable element according to the display time and the display location in the following way: based on the display location, rendering and displaying the touchable element on a middle layer of the video interface at the display time, wherein the video interface comprises three layers, i.e. the middle layer of the video interface for displaying the touchable element, a bottom layer of the video interface for displaying video frames, and a top layer of the video interface for displaying a playback control component; or, based on the display location, rendering and displaying the touchable element on a top layer of the video interface at the display time; wherein the video interface comprises two layers, i.e. a bottom layer of the video interface for displaying video frames, and the top layer of the video interface for displaying the touchable element and a playback control component.

In an embodiment, the display location of the touchable element may not overlap with that of the playback control component; or, when the display location of the touchable element overlaps with that of the playback control component, upon detecting a touch operation at the display location, whether the touch operation is aimed at either the touchable element or the playback control component is determined according to preset response priorities, and when the touch operation is aimed at the touchable element, the touch operation is responded according to a preset response tactic for the touchable element, and when the touch operation is aimed at the playback control component, the touch operation is responded according to a preset response tactic for the playback control component.

In an embodiment, the display location of the touchable element on the video interface is a fixed location or locations changing dynamically.

In an embodiment, the touch operation response module 113 responds to the touch operation according to a preset response tactic in the following way including: at least one of displaying a preset content, displaying a preset animation effect, playing a preset audio or video, redirecting to a page, performing a preset function, communicating with a preset server, enabling a preset application, and popping up a preset function interface.

In an embodiment, the touch operation response module 113 responds to the touch operation according to a preset response tactic in the following way: acquiring a feedback content determined based on a preset response tactic and related information of the touch operation is acquired, and displaying the feedback content.

In an embodiment, the device further includes: an information collection module configured for, after detection of the touch operation on the displayed touchable element, collecting related information of the touch operation; and the touch operation response module 113 includes: a first feedback content display unit configured for, with preset conditions satisfied, acquiring a feedback content determined based on the preset response tactic and the collected related information of the touch operation; and displaying the feedback content; or, a second feedback content display unit configured for acquiring a feedback content determined based on the preset response tactic and the collected related information of the touch operation; and with preset conditions satisfied, displaying the feedback content.

In an embodiment, the information collection module is configured for: reporting related information of the touch operation to a server; the first feedback content display unit includes: a first feedback content receiving subunit configured for, with preset conditions satisfied, receiving a feedback content sent from the server, wherein the feedback content is generated by the server based on the preset response tactic and the received related information of the touch operation.

In an embodiment, the first feedback content receiving subunit is configured for: upon reaching a set point in time during a progress of playing video, receiving a feedback content sent from the server; or, upon detecting a touch operation on a preset control, sending a response request to the server, and receiving a feedback content sent from the server according to the response request; or, upon reaching a set point in time during a progress of playing video, displaying an interactive bar element based on information for displaying the interactive bar element sent from the server, and upon detecting a touch operation on the interactive bar element, sending a response request to the server, and receiving a feedback content sent from the server according to the response request.

In an embodiment, the response request sent to the server upon detecting a touch operation on a preset control contains an execution time of the touch operation on the preset control so as to allow the server generates the feedback content according to the execution time of the touch operation on the preset control.

In an embodiment, the information collection module is configured for: reporting related information of the touch operation to a server; the second feedback content display unit is configured for a acquiring a feedback content generated according to the preset response tactic and the received related information of the touch operation and sent from the server; and displaying the feedback content upon reaching a set point in time during a progress of playing video; or acquiring a feedback content generated according to the preset response tactic and the received related information of the touch operation and sent from the server; and displaying the feedback content upon detecting a touch operation on a preset control; or acquiring a feedback content generated according to the preset response tactic and the received related information of the touch operation and sent from the server; and upon reaching a set point in time during a progress of playing video, displaying an interactive bar element based on information for displaying the interactive bar element sent from the server; and upon detecting a touch operation on the interactive bar element, displaying the feedback content.

In an embodiment, the information collection module is configured for: caching related information of the touch operation; the first feedback content display unit includes: a first feedback content determination subunit configured for, with preset conditions satisfied, determining a feedback content according to the cached related information of the touch operation and a response tactic sent from the server.

In an embodiment, the first feedback content determination subunit is configured for: upon reaching a set point in time during a progress of playing video, determining a feedback content according to the cached related information of the touch operation and a response tactic sent from the server; or upon detecting a touch operation on a preset control, determining a feedback content according to the cached related information of the touch operation and a response tactic sent from the server.

In an embodiment, the first feedback content determination subunit is configured for: upon detecting a touch operation on a preset control, determining a feedback content according to the cached related information of the touch operation and a response tactic sent from the server in the following way: upon detecting a touch operation on a preset control, determining a feedback content according to an execution time of the touch operation on the preset control, the cached related information of the touch operation, and a response tactic sent from the server.

In an embodiment, the information collection module is configured for: caching related information of the touch operation; the second feedback content display unit is configured for: determining a feedback content according to the cached related information of the touch operation and a response tactic sent from the server, and upon reaching a set point in time during a progress of playing video, displaying the feedback content; or, determining a feedback content according to the cached related information of the touch operation and a response tactic sent from the server, and upon detecting a touch operation on a preset control, displaying the feedback content.

In an embodiment, the device further includes: an association display module configured for, upon detecting a touch operation on the touchable element, displaying an association between the touchable element and the preset control.

In an embodiment, the response tactic includes: generating the feedback content according to statistical data about touch operations performed by one or more users on the touchable element.

In an embodiment, the response tactic includes: determining a touchable element on which a current user has performed a touch operation and a touchable element on which the current user has not performed a touch operation, predicting the behavior of the current user based on the touchable element on which the current user has performed a touch operation and the touchable element on which the current user has not performed a touch operation, and determining a feedback content according to a prediction result.

In an embodiment, the device further includes: a configuration information determination module configured for acquiring a touchable element to be displayed in the process of playing video and configuration information of the touchable element sent from a server, wherein the delivered touchable element and the subsequently delivered configuration information of the touchable element is determined according to a prediction result, and the prediction result is a result of predicting the behavior of a current user based on a touchable element on which the current user has performed a touch operation and a touchable element on which the current user has not performed a touch operation.

In an embodiment, the related information of the touch operation includes: at least one of an identifier of a touchable element corresponding to the touch operation, a time of playing video when the touch operation occurs, and attributes of a current user.

In an embodiment, in displaying the feedback content, playing video is not interrupted; or, when the displayed feedback content comprises a content of a preset category, playing video is controlled to be paused, and when the displayed feedback content does not comprise a content of a preset category, it is determined not to pause the video playback.

In an embodiment, the touch operation response module 113 displays the feedback content in the following way: displaying the feedback content on a browser page; or, displaying the feedback content on a video playing page; or, displaying the feedback content via a local page.

In an embodiment, in displaying the feedback content on a browser page, the browser page is displayed on the same screen with a video interface, and the browser page and the video interface partially overlap.

In an embodiment, the device further includes: a touch operation processing module configured for, after the feedback content is displayed on the browser page, upon detecting a touch operation on a touchable element displayed on the browser page, responding to the detected touch operation on the touchable element displayed on the browser page.

In an embodiment, the touch operation processing module is configured to respond to the detected touch operation on the touchable element displayed on the browser page in the following way: determining a target point in time for adjusting the progress of playing video corresponding to the touchable element displayed on the browser page, sending the target point in time to an application playing the video via a browser, and adjusting the progress of playing video to the target point in time by the application playing the video.

In an embodiment, one or more touchable elements are displayed on the browser page, and different touchable elements displayed on the browser page correspond to different or same response modes.

In an embodiment, the touchable element is a visible or invisible element.

This embodiment further provides a device for displaying information in a video, the device including: an information collection module configured for, upon detecting a touch operation on the touchable element on a video interface in the process of playing video, collecting related information of the touch operation is collected; and a feedback content display module configured for, when preset conditions are satisfied, acquiring a feedback content determined based on the preset response tactic and the collected related information of the touch operation, and displaying the feedback content; or, acquiring a feedback content generated based on the preset response tactic and the collected related information of the touch operation, and when preset conditions are satisfied, displaying the feedback content.

This embodiment further provides a device for displaying information in a video, the device including: a feedback content acquisition module configured for, upon detecting a touch operation on the touchable element on a video interface in the process of playing video, acquiring a feedback generated based on related information of the touch operation and a preset response tactic; and a feedback content display module configured for displaying the feedback content on a browser page.

This embodiment further provides a device for displaying information in a video, the device including: a feedback content acquisition module configured for, upon detecting a touch operation on the touchable element on a video interface in the process of playing video, acquiring a feedback content generated according to a preset response tactic and related information of the touch operation; wherein the related information of the touch operation includes; a time of playing video corresponding to the touch operation; and a feedback content display module configured for displaying the feedback content.

This embodiment further provides a device for displaying information in a video, the device including: a feedback content generation module configured for, upon detecting a touch operation on the touchable element on a video interface in the process of playing video, acquiring a feedback content generated according to a preset response tactic and related information of the touch operation; wherein the related information of the touch operation includes user attributes; and a feedback content display module configured for displaying the feedback content.

This embodiment further provides a playback control device, the device including: a feedback content display module configured for, upon detecting a touch operation on a first touchable element on a video interface in the process of playing video, acquiring a feedback content generated based on related information of the touch operation and a preset response tactic, and displaying the feedback content on a browser page; and a playback progress adjusting module configured for, upon detecting a touch operation on a second touchable element on the browser page, adjusting the progress of playing video according to the touch operation on the second touchable element.

The device for displaying information in a video provided by the embodiment of the present disclosure can execute the method for displaying information in a video provided by any embodiment of the present disclosure, and is provided with corresponding functional modules for performing the method for displaying information in a video. The video playback control device provided by the embodiment of the disclosure can execute the video playback control method provided by any embodiment of the disclosure, and is provided with corresponding functional modules for performing the video playback control method.

Twelfth Embodiment

Figure 12:
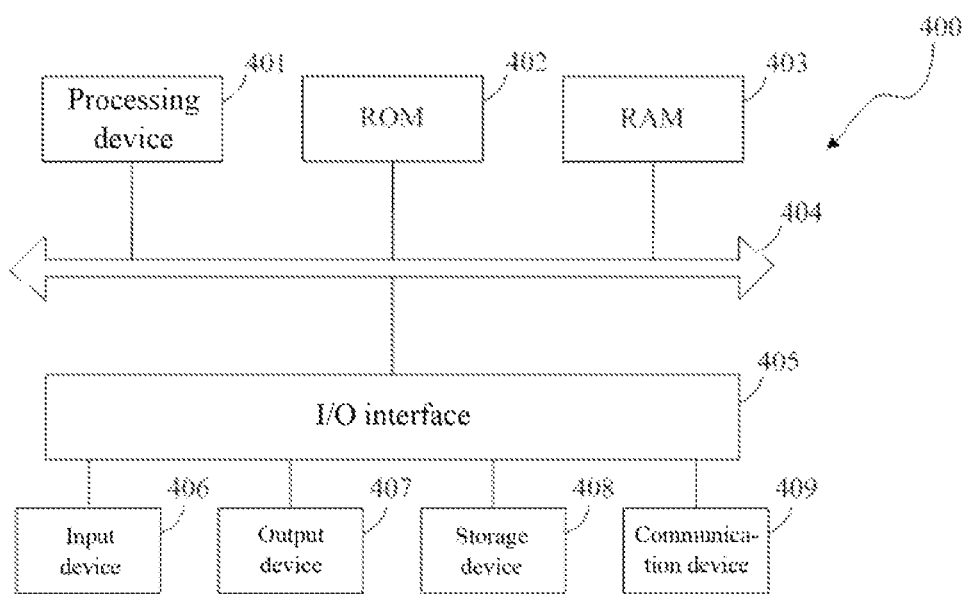
FIG. 12 is a structural schematic view of a terminal apparatus provided by a twelfth embodiment of the disclosure.

FIG. 12 shows a schematic diagram illustrating a terminal apparatus provided by Embodiment 12 of the disclosure. Terminal apparatus in the embodiments of the present disclosure may include, but are not limited to, mobile terminals such as mobile phones, notebook computers, digital broadcast receivers, Personal Digital Assistants (PDAs), Portable Android Devices (PADs), Portable Media Players (PMPs), car terminals (e.g., car navigation terminals), and the like, as well as fixed terminals such as digital televisions (TVs), desktop computers, and the like. The terminal apparatus shown in FIG. 12 is merely an example and should not impose any limitations on the functionality and scope of use of embodiments of the present disclosure.

As shown in FIG. 12, the terminal apparatus 400 may include a processing device (e.g., a central processor, a graphics processor, etc.) 401 that may perform a variety of suitable actions and processes in accordance with a program stored in a read-only memory (ROM) 402 or a program loaded from a storage device 408 into a random access memory (RAM) 403. In the RAM 403, various programs and data required for the operation of the terminal apparatus 400 are also stored. The processing device 401, the ROM 402 and the RAM 403 are connected to each other via a bus 404. An input/output (I/O) interface 405 is also connected to the bus 404.

In general, the following devices may be connected to the I/O interface 405; an input device 406 including, for example, a touch screen, a touch pad, a keyboard, a mouse, a camera, a microphone, an accelerometer, a gyroscope, etc.; an output device 407 including, for example, a liquid crystal display (LCD), a speaker, a vibrator, etc.; a storage device 408 including, for example, magnetic tape, hard disk, etc.; and a communication device 409. The communication device 409 may allow the terminal apparatus 400 to communicate in a wireless or wired manner with other devices to exchange data. Although FIG. 12 illustrates a terminal apparatus 400 having a variety of devices, it should be understood that not all illustrated devices are required to be implemented or provided. More or fewer devices may alternatively be implemented or provided.

In accordance with embodiments of the present disclosure, the processes described above with reference to the flowcharts may be implemented as computer software programs. For example, embodiments of the present disclosure include a computer program product comprising a computer program carried on a computer-readable medium, the computer program containing program code for performing the methods shown in the flowchart. In such an embodiment, the computer program may be downloaded and installed from the network via the communication device 409, or installed from the storage device 408, or installed from the ROM 402. When the computer program is executed by the processing device 401, the above-mentioned functions defined in the method of the embodiments of the present disclosure are performed.

The apparatus provided by the embodiment of the present disclosure corresponds to the method for displaying information in a video or the video playback control method provided by the above-mentioned embodiments, and reference can be made to the above-mentioned embodiments for details which are not described in the present embodiment.

Thirteen Embodiment

Embodiment 13 of the disclosure provides a computer storage medium having stored a computer program, when executed by a processor, causes the processor to implement the method for displaying information in a video or the video playback control method provided by any of the embodiments described above.

It should be noted that the computer storage media described above in this disclosure may be computer readable signal media or computer readable storage media or any combination of the two. The computer-readable storage medium may be, for example but not limited to, an electrical, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a RAM, a ROM, an erasable programmable read-only memory (EPROM) or flash memory (FLASH), an optical fiber, a compact disc read-only memory (CD-ROM), an optical storage device, a magnetic storage device, or any suitable combination thereof. In the present disclosure, a computer-readable storage medium can be any tangible medium that can contain or store a program for use by or in connection with an instruction execution system, apparatus, or device. In the present disclosure, a computer-readable signal medium may include a data signal that propagates in baseband or as part of a carrier wave, carrying computer-readable program code. Such propagated data signals may take many forms, including but not limited to electromagnetic signals, optical signals, or any suitable combination thereof. The computer-readable signal medium may also be any computer-readable medium other than the computer-readable storage medium that can transmit, propagate, or transport the program for use by or in connection with the instruction execution system, apparatus, or device. The program code embodied on the computer-readable medium may be transmitted using any suitable medium including, but not limited to: wire, fiber optic cable, radio frequency (RF), and the like, or any suitable combination thereof.

The computer storage can be contained in the terminal apparatus; it may also be separate and not assembled into the terminal apparatus.

The computer storage carries one or more programs which, when executed by the terminal apparatus, cause the terminal apparatus to: acquire a touchable element to be displayed in the process of playing video and configuration information of the touchable element sent from a server; determine, according to the configuration information of the touchable element, a display time of the touchable element in the process of playing video and a display location of the touchable element on a video interface, and display the touchable element according to the display time and the display location; and upon detecting a touch operation on the displayed touchable element, respond to the touch operation according to a preset response tactic.

Computer program code for carrying out operations of the present disclosure may be written in one or more programming languages, including object-oriented programming languages such as Java, Smalltalk, C++, and conventional procedural programming languages such as the "C" language or similar programming languages, or a combination thereof. The program code may execute entirely on the user's computer, partially on the user's computer, as a stand-alone software package, partially on the user's computer, partially on a remote computer, or entirely on a remote computer or server. In the case of a remote computer, the remote computer may be connected to the user computer through any kind of network, including a local area network (LAN) or a wide area network (WAN), or may be connected to an external computer (e.g., through the Internet using an Internet service provider).

The flowcharts and block diagrams in the drawings illustrate the architecture, functionality, and operation of possible implementations of systems, methods, and computer program products in accordance with various embodiments of the present disclosure. In this regard, each block of the flowcharts or block diagrams may represent a module, segment, or portion of code, which comprises one or more executable instructions for implementing the specified logical function (s). It should also be noted that in some alternative implementations, the functions noted in the blocks may occur out of the order noted in the figures. For example, two blocks shown in succession may, in fact, be executed substantially concurrently or they may sometimes be executed in the reverse order, depending upon the functionality involved. It is also noted that each block of the block diagrams and/or flowchart illustrations, and combinations of blocks in the block diagrams and/or flowchart illustrations, can be implemented by special purpose hardware-based systems which perform the specified functions or operations, or combinations of special purpose hardware and computer instructions.

The units described in the embodiments of the present disclosure may be implemented in software or in hardware. Among others, the name of a unit does not constitute a definition of the unit itself in some cases; for example, a first configuration information acquisition module can also be described as "a module for acquiring a touchable element to be displayed in the process of playing video and configuration information of the touchable element sent from a server".

The foregoing description is only illustrative of the embodiments of the present disclosure and the technical principles employed. It should be understood by those skilled in the art that the scope of the disclosure referred to in this disclosure is not limited to the particular combination of features described above, but is intended to cover other embodiments which may be formed by any combination of features described above or their equivalents without departing from the spirit of the disclosure. For example, the above-mentioned features are mutually replaced with technical features disclosed in the present disclosure (but not limited to) having similar functions to form a technical solution.

What is claimed is:

1. A method of displaying information on video, comprising:
   acquiring a touchable element to be displayed in a process of playing video and configuration information of the touchable element sent from a server, wherein the acquiring a touchable element to be displayed in a process of playing video and configuration information of the touchable element sent from a server comprises:
   acquiring the touchable element to be displayed in the process of playing video and the configuration information of the touchable element sent from the server before playing the video; or receiving the touchable element to be displayed in the process of playing video and the configuration information of the touchable element sent from the server during playing the video; or sending a delivery request to the server at first set time in the process of playing video, and receiving the touchable element to be displayed at second set time in the process of playing video and the configuration information of the touchable element sent from the server, wherein the second set time is latter than the first set time;

determining, based on the configuration information of the touchable element, display time of the touchable element in the process of playing video and a display location of the touchable element on a video interface, and displaying the touchable element based on the display time and the display location; and upon detection of a touch operation on the touchable element which is displayed, responding to the touch operation based on a preset response tactic.

2. The method according to claim 1, wherein the configuration information of the touchable element comprises: at least one of display start time, display duration, display location, and display effect information.

3. The method according to claim 2, wherein the display effect information of the touchable element is determined by the server based on statistical data of touch operations performed by at least one user on the touchable element.

4. The method according to claim 1, wherein the displaying the touchable element based on the display time and the display location comprises:

based on the display location, rendering and displaying the touchable element on a middle layer of the video interface at the display time, wherein the video interface comprises three layers; the middle layer of the video interface is configured for displaying the touchable element, a bottom layer of the video interface is configured for displaying video frames, and a top layer of the video interface is configured for displaying a playing control assembly; or, based on the display location, rendering and displaying the touchable element on a top layer of the video interface at the display time, wherein the video interface comprises two layers; a bottom layer of the video interface is configured for displaying video frames, and a top layer of the video interface is configured for displaying the touchable element and a playing control assembly.

5. The method according to claim 4, wherein the display location of the touchable element is non-overlapped with the display location of the playing control assembly; or, when the display location of the touchable element overlaps with the display location of the playing control assembly, and the touch operation is detected at the display location, determining whether the touch operation aims at either the touchable element or the playing control assembly based on a preset response priority, and when the touch operation aims at the touchable element, responding to the touch operation based on the preset response tactic for the touchable element; when the touch operation aims at the playing control assembly, responding to the touch operation based on the preset response tactic for the playing control assembly.

6. The method according to claim 1, wherein the display location of the touchable element on the video interface is a fixed location or a plurality of locations changing dynamically.

7. The method according to claim 1, wherein the responding to the touch operation based on a preset response tactic comprises: at least one of displaying a preset content, displaying a preset animation effect, playing a preset audio or video, redirecting to a page, performing a preset function, communicating with a preset server, launching a preset application, and popping up a preset function interface.

8. The method according to claim 1, wherein the responding to the touch operation based on a preset response tactic comprises:

acquiring a feedback content determined based on the preset response tactic and related information of the touch operation; and displaying the feedback content.

9. The method according to claim 8, wherein after the upon detection of a touch operation on the touchable element which is displayed, the method further comprises: collecting the related information of the touch operation;

wherein the acquiring a feedback content determined based on the preset response tactic and related information of the touch operation; displaying the feedback content comprises:

when a preset condition is satisfied, acquiring the feedback content determined based on the preset response tactic and collected related information of the touch operation; and displaying the feedback content; or, acquiring the feedback content determined based on the preset response tactic and collected related information of the touch operation; when a preset condition is satisfied, displaying the feedback content.

10. The method according to claim 9, wherein the collecting the related information of the touch operation comprises: reporting the related information of the touch operation to the server;

wherein the when a preset condition is satisfied, acquiring the feedback content determined based on the preset response tactic and collected related information of the touch operation; and displaying the feedback content comprises:

when the preset condition is satisfied, receiving the feedback content sent from the server, wherein the feedback content is generated by the server based on the preset response tactic and received related information of the touch operation.

11. The method according to claim 10, wherein the when the preset condition is satisfied, receiving the feedback content sent from the server comprises:

when it is time to a set point in time during a progress of playing video, receiving the feedback content sent from the server; or, when the touch operation on a preset control is detected, sending a response request to the server, and receiving the feedback content sent from the server based on the response request; or, when it is time to a set point in time during a progress of playing video, displaying an interactive bar element based on information for displaying the interactive bar element sent from the server; when the touch operation on the interactive bar element is detected, sending a response request to the server, and receiving the feedback content sent from the server based on the response request.

12. The method according to claim 11, wherein the response request sent to the server upon detecting the touch operation on the preset control comprises execution time of the touch operation on the preset control, so as to allow the server to generate the feedback content based on the execution time of the touch operation on the preset control.

13. The method according to claim 9, wherein the collecting the related information of the touch operation comprises: reporting the related information of the touch operation to the server;
wherein the acquiring the feedback content determined based on the preset response tactic and collected related information of the touch operation; when a preset condition is satisfied, displaying the feedback content comprises:
acquiring the feedback content generated based on the preset response tactic and received related information of the touch operation sent from the server; when it is time to a set point in time during a progress of playing video, displaying the feedback content; or,
acquiring the feedback content generated based on the preset response tactic and received related information of the touch operation sent from the server; when the touch operation on a preset control is detected, displaying the feedback content; or,
acquiring the feedback content generated based on the preset response tactic and received related information of the touch operation sent from the server; when it is time to a set point in time during a progress of playing video, displaying an interactive bar element based on information for displaying the interactive bar element sent from the server; when the touch operation on the interactive bar element is detected, displaying the feedback content.

14. The method according to claim 9, wherein the collecting the related information of the touch operation comprises: caching the related information of the touch operation;
wherein the when a preset condition is satisfied, acquiring the feedback content determined based on the preset response tactic and collected related information of the touch operation comprises:
when the preset condition is satisfied, determining the feedback content based on cached related information of the touch operation and the response tactic sent from the server;
wherein the when the preset condition is satisfied, determining the feedback content based on cached related information of the touch operation and the response tactic sent from the server comprises:
when it is time to a set point in time during a progress of playing video, determining the feedback content based on the cached related information of the touch operation and the response tactic sent from the server; or
when the touch operation on a preset control is detected, determining the feedback content based on the cached related information of the touch operation and the response tactic sent from the server.

15. The method according to claim 14, wherein the when the touch operation on a preset control is detected, determining the feedback content based on the cached related information of the touch operation and the response tactic sent from the server comprises:
when the touch operation on the preset control is detected, determining the feedback content based on execution time of the touch operation on the preset control, the cached related information of the touch operation, and the response tactic sent from the server.

16. The method according to claim 9, wherein the collecting the related information of the touch operation comprises: caching the related information of the touch operation;
wherein the acquiring the feedback content determined based on the preset response tactic and collected related information of the touch operation; when a preset condition is satisfied, displaying the feedback content comprises:
determining the feedback content based on cached related information of the touch operation and a response tactic sent from the server, and when it is time to a set point in time during a progress of playing video, displaying the feedback content; or,
determining the feedback content based on cached related information of the touch operation and a response tactic sent from the server, and when the touch operation on a preset control is detected, displaying the feedback content.

17. The method according to claim 11, wherein the method further comprises:
when the touch operation on the touchable element is detected, displaying relevance between the touchable element and the preset control.

18. The method according to claim 8, wherein the response tactic comprises: generating the feedback content based on statistical data of the touch operation performed by at least one user on the touchable element.

19. The method according to claim 8, wherein the response tactic comprises:
determining a touchable element on which a current user has performed the touch operation and a touchable element on which the current user has not performed the touch operation, predicting a behavior of the current user based on the touchable element on which the current user has performed the touch operation and the touchable element on which the current user has not performed the touch operation, and determining the feedback content based on a prediction result.

20. The method according to claim 8, wherein the related information of the touch operation comprises: at least one of an identifier of the touchable element corresponding to the touch operation, time of playing video corresponding to the touch operation, and an attribute of a current user.

21. The method according to claim 8, wherein when the feedback content is displayed, the process of playing video is uninterrupted; or, when the feedback content displayed comprises a content in a preset category, controlling the video to be paused, and when the feedback content displayed excludes the content of the preset category, continuing playing video.

22. The method according to claim 8, wherein the displaying the feedback content comprises:
displaying the feedback content on a browser page; or,
displaying the feedback content on video playing page; or,
displaying the feedback content on a local page;
wherein when the feedback content is displayed on the browser page, the browser page is displayed on a same screen with the video interface, and the browser page and the video interface partially overlap.

23. The method according to claim 22, wherein after the displaying the feedback content on a browser page, the method further comprises:
when the touch operation on the touchable element displayed on the browser page is detected, responding to the touch operation detected on the touchable element displayed on the browser page;

wherein the responding to the touch operation detected on the touchable element displayed on the browser page comprises:

determining a target point in time for adjusting the process of playing video corresponding to the touchable element displayed on the browser page, sending the target point in time to an application playing the video via a browser, and adjusting the process of playing video to the target point in time by the application playing the video.

24. The method according to claim 23, wherein at least one touchable element is displayed on the browser page, and different touchable elements displayed on the browser page correspond to different or same response modes.

25. The method according to claim 1, wherein the touchable element is a visible element or an invisible element.

26. A terminal apparatus, comprising:

at least one processor;

a memory, configured to store at least one program;

the at least one program, when executed by the at least one processor, causing the at least one processor to:

acquire a touchable element to be displayed in a process of playing video and configuration information of the touchable element sent from a server, wherein acquiring a touchable element to be displayed in a process of playing video and configuration information of the touchable element sent from a server comprises:

acquiring the touchable element to be displayed in the process of playing video and the configuration information of the touchable element sent from the server before playing the video; or receiving the touchable element to be displayed in the process of playing video and the configuration information of the touchable element sent from the server during playing the video; or sending a delivery request to the server at first set time in the process of playing video, and receiving the touchable element to be displayed at second set time in the process of playing video and the configuration information of the touchable element sent from the server, wherein the second set time is latter than the first set time;

determine, based on the configuration information of the touchable element, display time of the touchable element in the process of playing video and a display location of the touchable element on a video interface, and display the touchable element based on the display time and the display location; and upon detection of a touch operation on the touchable element which is displayed, respond to the touch operation based on a preset response tactic.

27. A non-transitory computer readable storage medium, stored a computer program therein, when the computer program is executed by a processor, implementing operations of:

acquiring a touchable element to be displayed in a process of playing video and configuration information of the touchable element sent from a server, wherein the acquiring a touchable element to be displayed in a process of playing video and configuration information of the touchable element sent from a server comprises:

acquiring the touchable element to be displayed in the process of playing video and the configuration information of the touchable element sent from the server before playing the video; or receiving the touchable element to be displayed in the process of playing video and the configuration information of the touchable element sent from the server during playing the video; or sending a delivery request to the server at first set time in the process of playing video, and receiving the touchable element to be displayed at second set time in the process of playing video and the configuration information of the touchable element sent from the server, wherein the second set time is latter than the first set time;

determining, based on the configuration information of the touchable element, display time of the touchable element in the process of playing video and a display location of the touchable element on a video interface, and displaying the touchable element based on the display time and the display location; and upon detection of a touch operation on the touchable element which is displayed, responding to the touch operation based on a preset response tactic.

* * * * *